US012460852B2

(12) United States Patent
Chikami et al.

(10) Patent No.: US 12,460,852 B2
(45) Date of Patent: Nov. 4, 2025

(54) HEAT PUMP

(71) Applicants: DAIKIN INDUSTRIES, LTD., Osaka (JP); DAIKIN EUROPE N.V., Ostend (BE)

(72) Inventors: Hideo Chikami, Ostend (BE); Akshay Hattiangadi, Ostend (BE); Jasper Van De Vyver, Ostend (BE)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 511 days.

(21) Appl. No.: 17/628,036

(22) PCT Filed: Sep. 29, 2020

(86) PCT No.: PCT/JP2020/036763
§ 371 (c)(1),
(2) Date: Jan. 18, 2022

(87) PCT Pub. No.: WO2021/065847
PCT Pub. Date: Apr. 8, 2021

(65) Prior Publication Data
US 2022/0252317 A1 Aug. 11, 2022

(30) Foreign Application Priority Data
Sep. 30, 2019 (EP) ..................................... 19200520

(51) Int. Cl.
*F25B 49/02* (2006.01)
*F25B 13/00* (2006.01)

(52) U.S. Cl.
CPC ............ *F25B 49/022* (2013.01); *F25B 13/00* (2013.01); *F25B 2400/13* (2013.01);
(Continued)

(58) Field of Classification Search
CPC .... F25B 49/022; F25B 13/00; F25B 2400/13; F25B 2400/23; F25B 2600/021; F25B 2700/21152
See application file for complete search history.

(56) References Cited

U.S. PATENT DOCUMENTS

2011/0048055 A1  3/2011  Fujimoto et al.
2013/0025306 A1  1/2013  Matsukura et al.
(Continued)

FOREIGN PATENT DOCUMENTS

CN    102679609 A    9/2012
CN    104315752 A    1/2015
(Continued)

OTHER PUBLICATIONS

Satoshi et al. (JP2014119220A), English Translation, Jun. 30, 2014, Whole Document (Year: 2014).*
(Continued)

*Primary Examiner* — Jerry-Daryl Fletcher
*Assistant Examiner* — Keith Stanley Myers
(74) *Attorney, Agent, or Firm* — Birch, Stewart, Kolasch & Birch, LLP

(57) ABSTRACT

A heat pump includes a compressor, a first heat exchanger, a main expansion mechanism and a second heat exchanger arranged in a refrigeration path, the compressor having a suction port, a compression port and an injection port; a gas injection valve connected on a first side to the refrigeration path between the first heat exchanger and the main expansion mechanism and on a second side to the injection port of the compressor; a liquid injection valve connected on a first side to the refrigeration path between the first heat exchanger and the main expansion mechanism and on a second side between the second heat exchanger and the suction port of the compressor; and a controller configured
(Continued)

to operate the gas injection valve to inject partly gaseous refrigerant into the compressor, and operate the liquid injection valve to inject liquid refrigerant into the compressor through the suction port of the compressor.

18 Claims, 13 Drawing Sheets

(52) U.S. Cl.
CPC ..... *F25B 2400/23* (2013.01); *F25B 2600/021* (2013.01); *F25B 2700/21152* (2013.01)

(56) References Cited

U.S. PATENT DOCUMENTS

| | | |
|---|---|---|
| 2014/0151015 A1 | 6/2014 | Sun et al. |
| 2015/0082823 A1 | 3/2015 | Teraki et al. |

FOREIGN PATENT DOCUMENTS

| | | |
|---|---|---|
| CN | 105783136 A | 7/2016 |
| CN | 107036352 A | 8/2017 |
| EP | 3 705 811 A1 | 9/2020 |
| JP | 2009-109110 A | 5/2009 |
| JP | 2010-525292 A | 7/2010 |
| JP | 2011-122779 A | 6/2011 |
| JP | 2014-119220 A | 6/2014 |
| WO | WO 2008/130357 A1 | 10/2008 |

OTHER PUBLICATIONS

International Preliminary Report on Patentability and Written Opinion of the International Searching Authority for International Application No. PCT/JP2020/036763, dated Apr. 14, 2022.

International Search Report for PCT/JP2020/036763 mailed on Jan. 12, 2021.

Search Report issued in European priority application 19200520.5, dated Dec. 16, 2019.

Written Opinion of the International Searching Authority for PCT/JP2020/036763 (PCT/ISA/237) mailed on Jan. 12, 2021.

Design of Small Capacity Air Conditioners and Heat Pump, edited by Shi Wenxing, pp. 28-32, Chinese Architecture & Building Press, Oct. 2013.

* cited by examiner

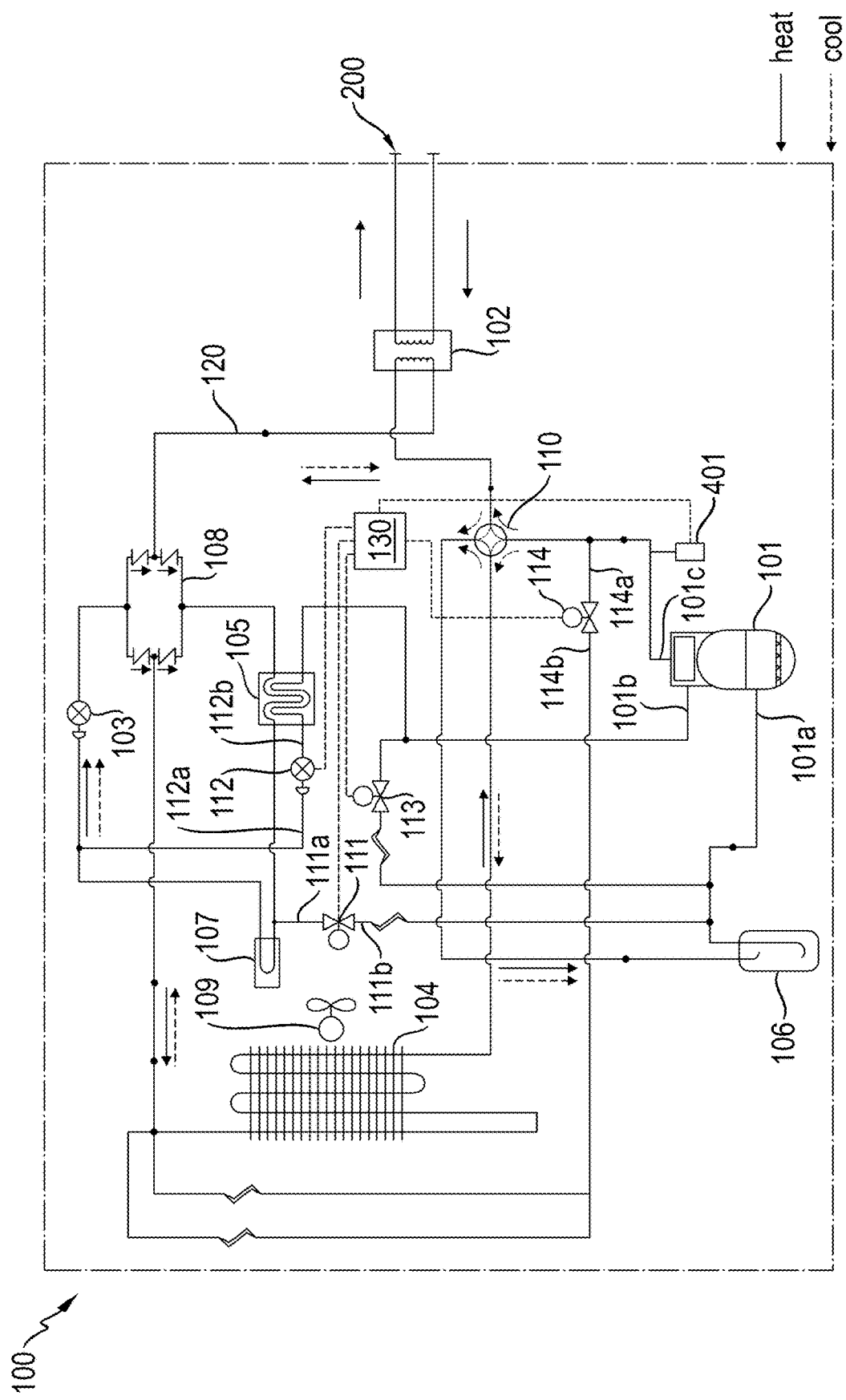
[Fig. 1]

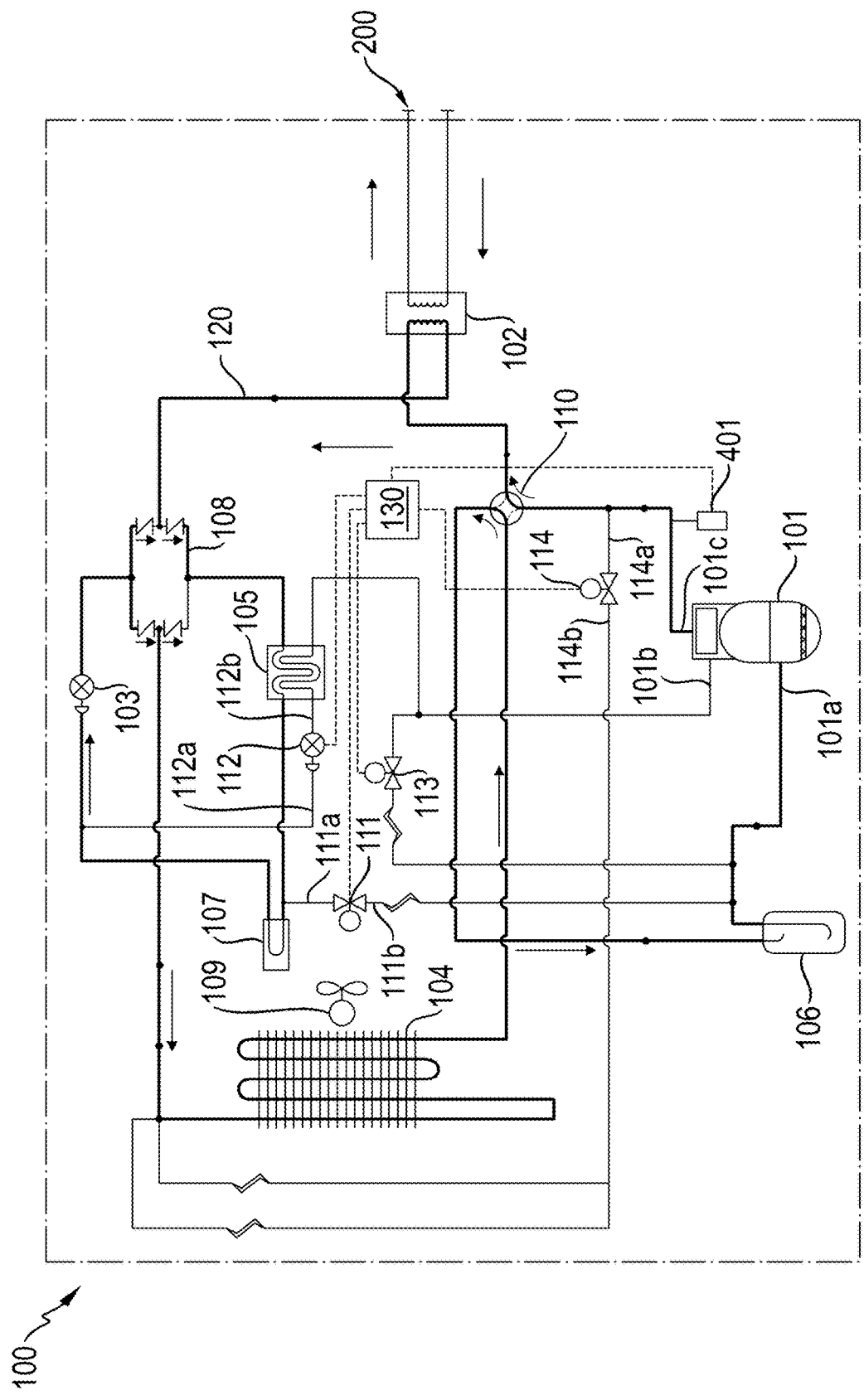
[Fig. 2]

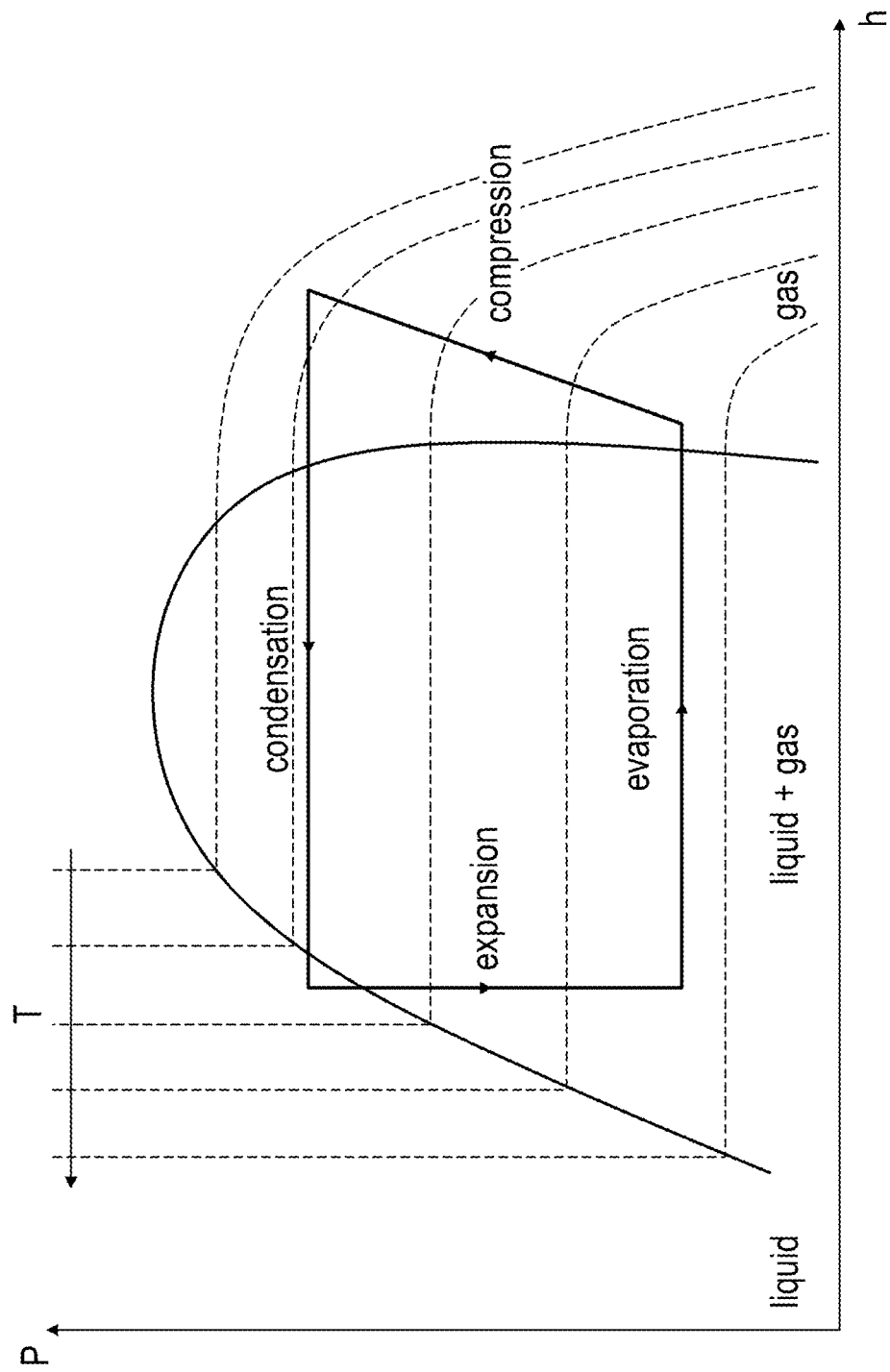
[Fig. 3]

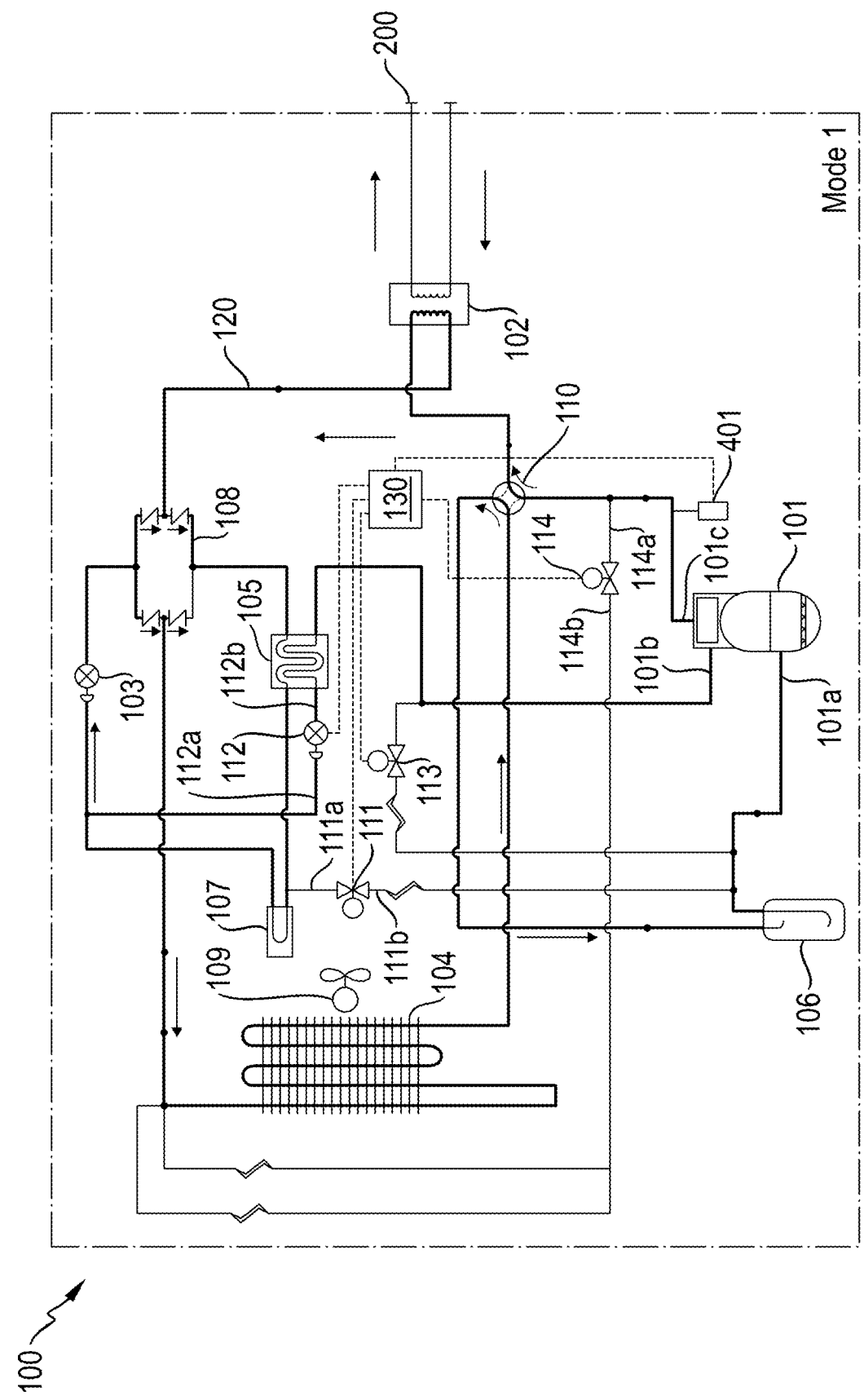
[Fig. 4]

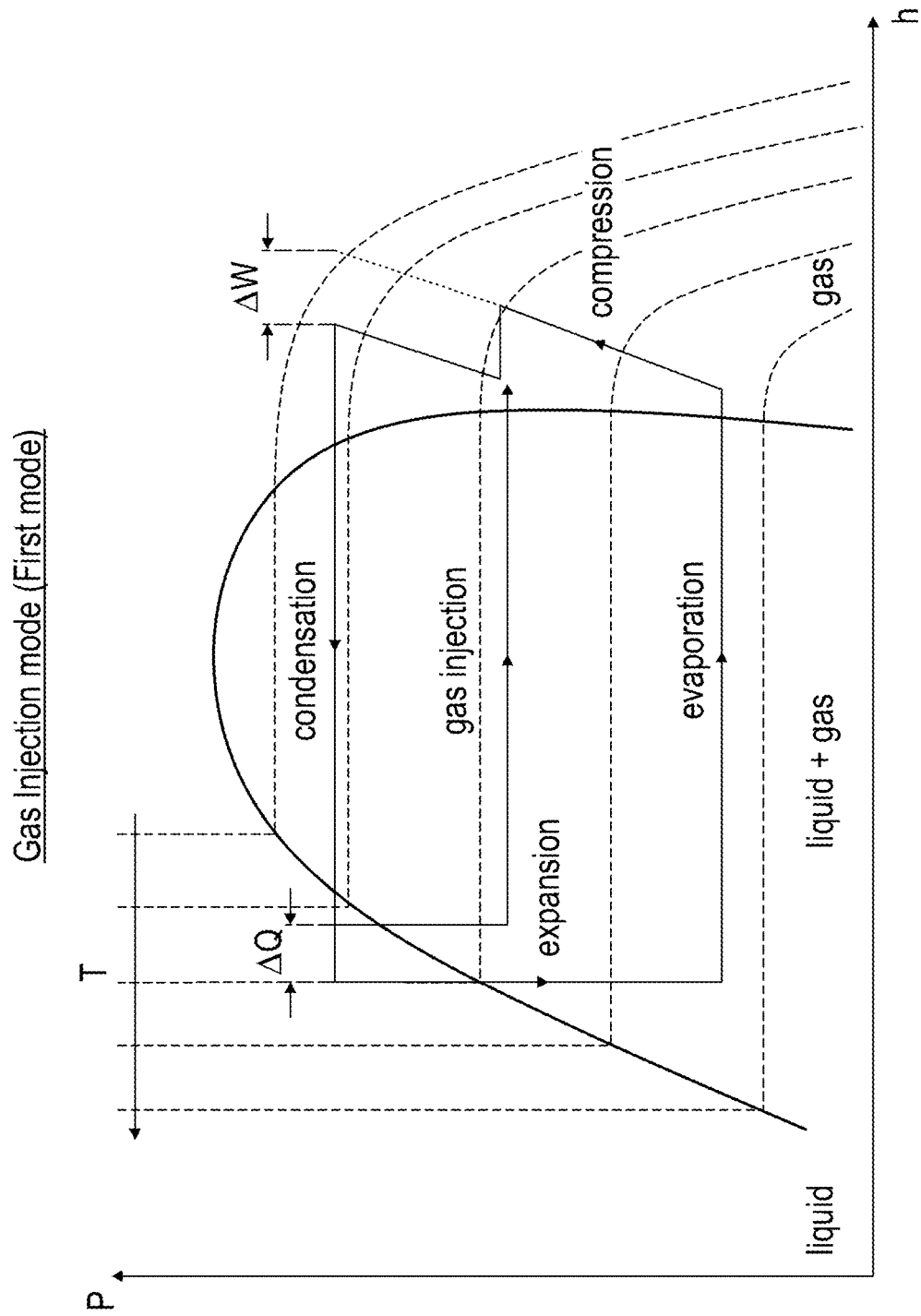
[Fig. 5A]

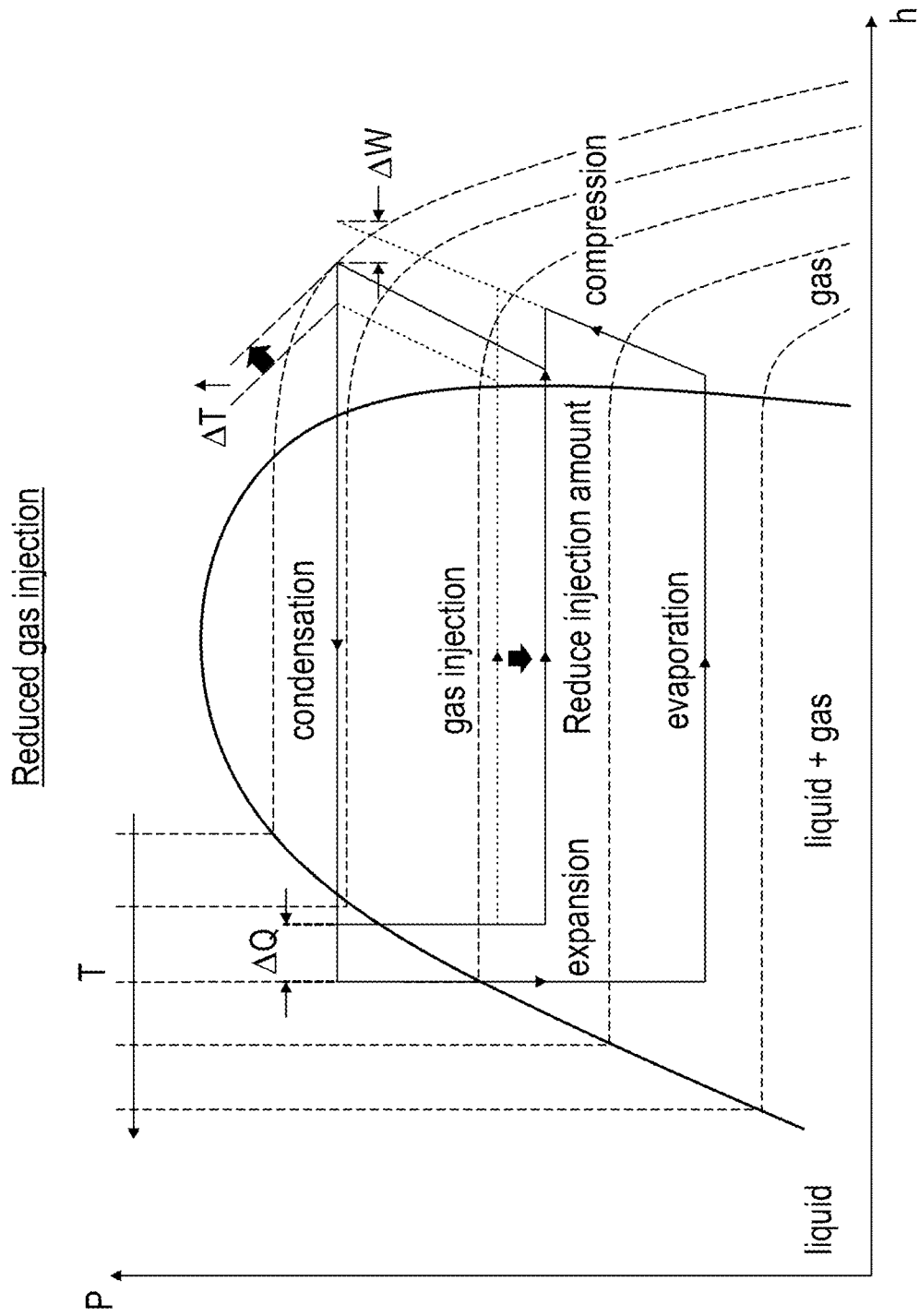
[Fig. 5B]

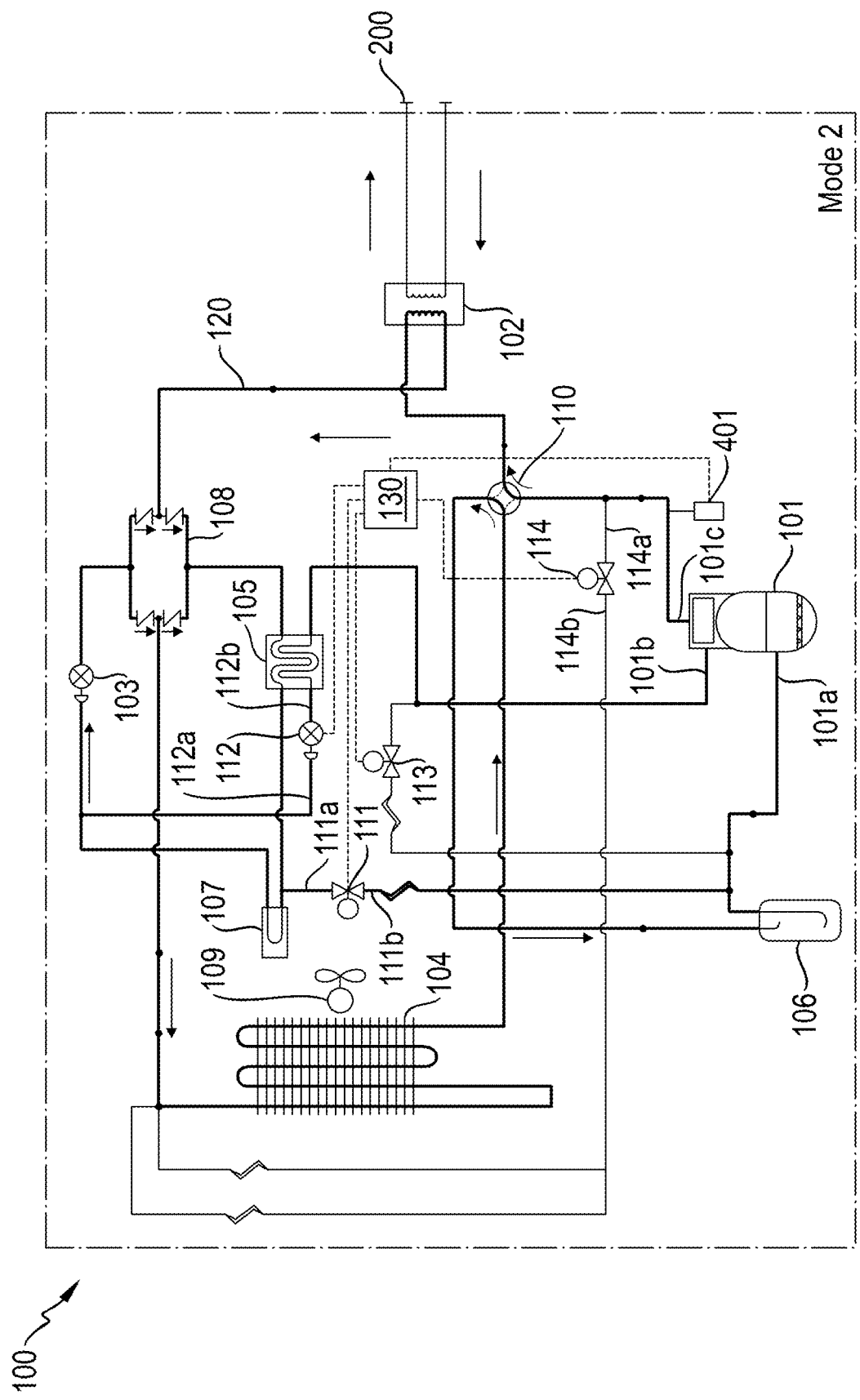
[Fig. 6]

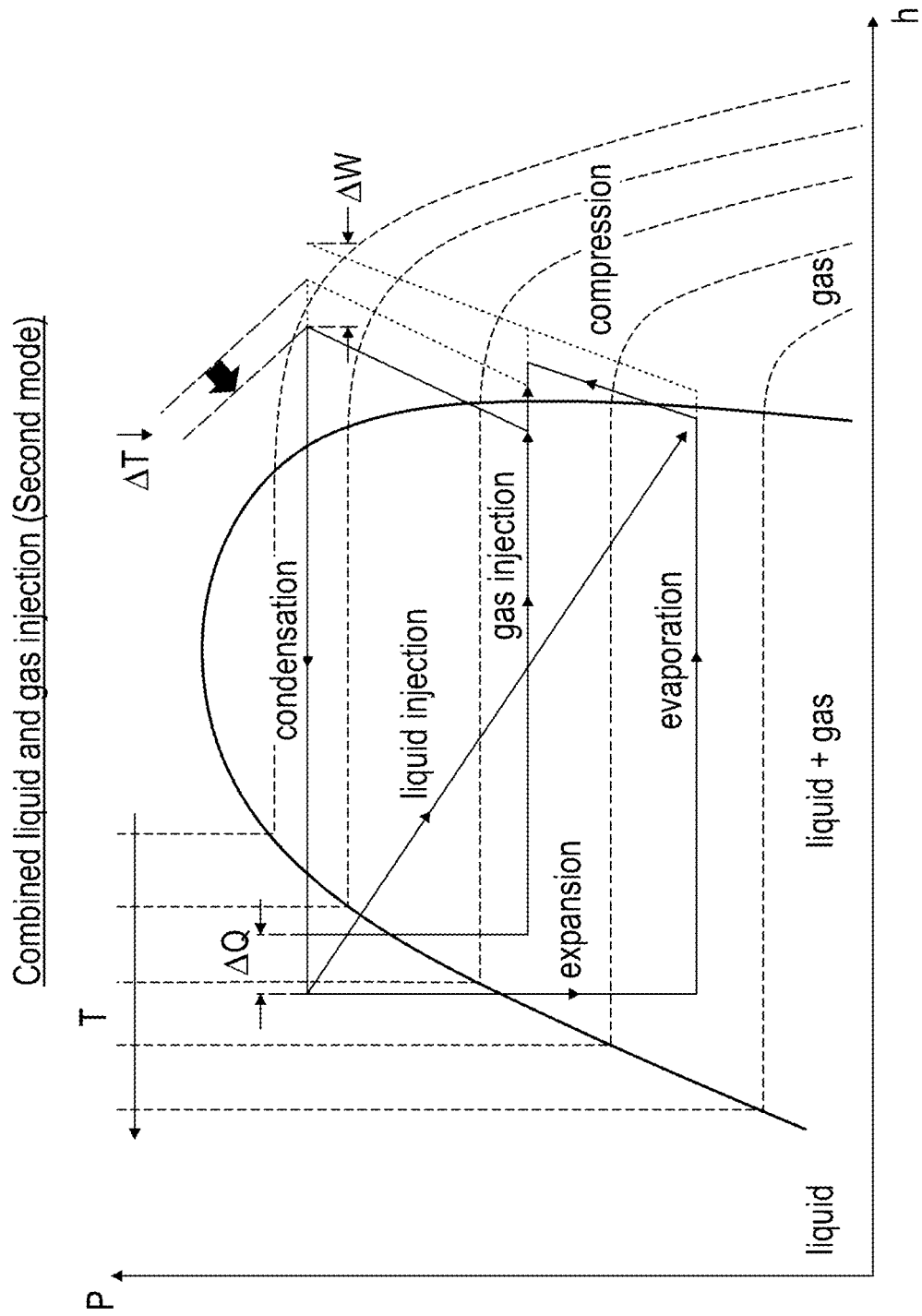
[Fig. 7]

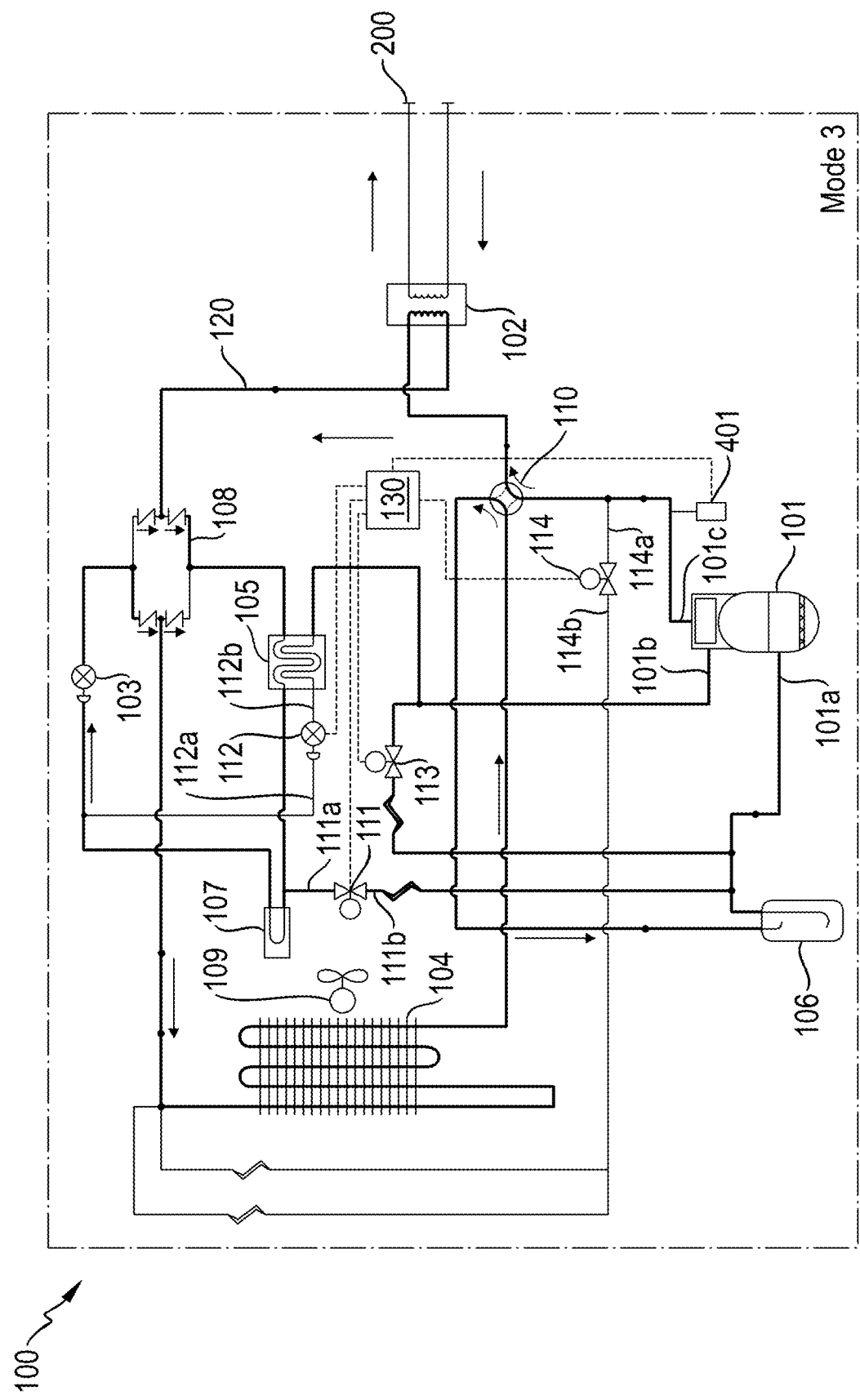
[Fig. 8]

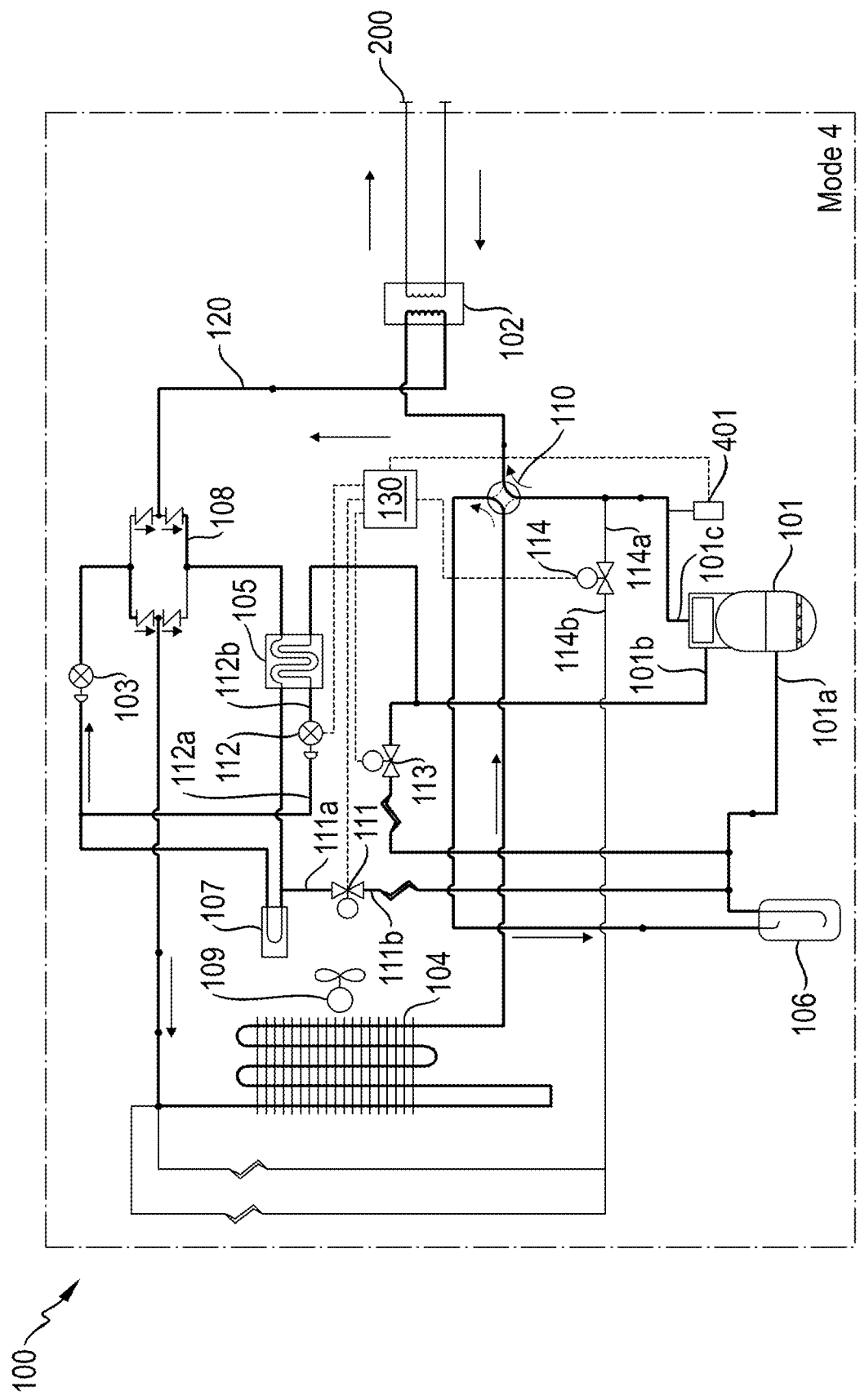
[Fig. 9]

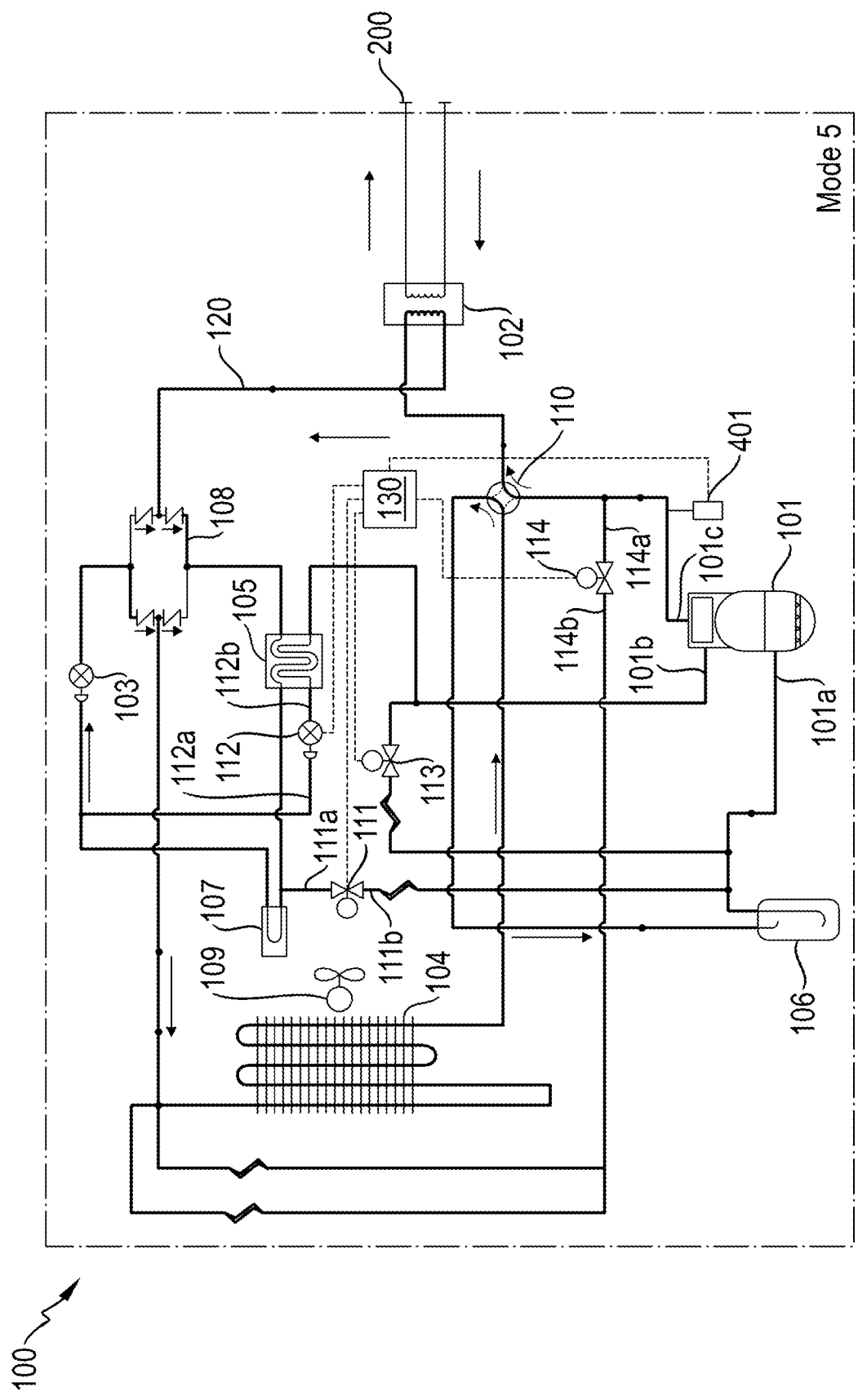
[Fig. 10]

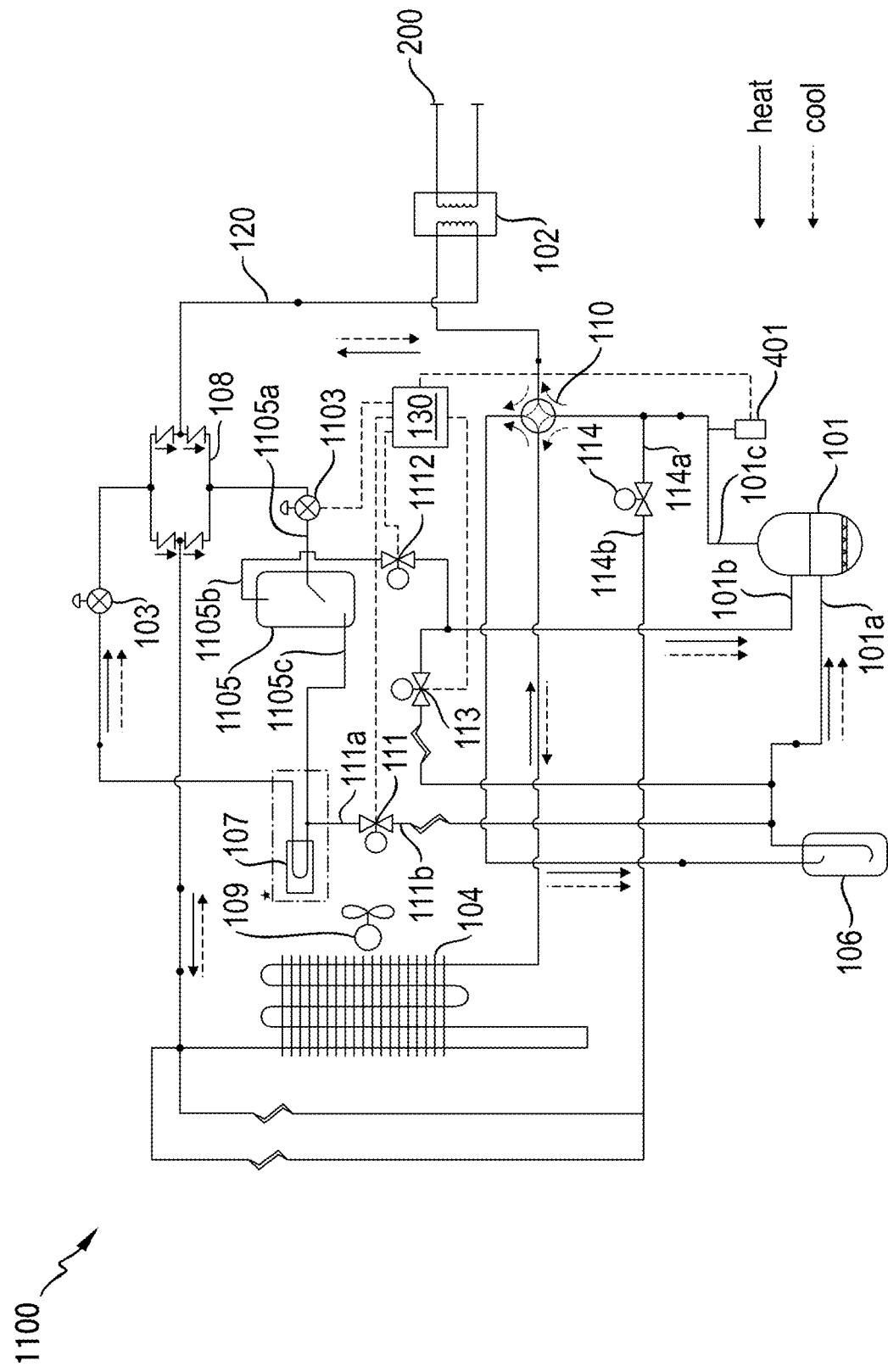
[Fig. 11]

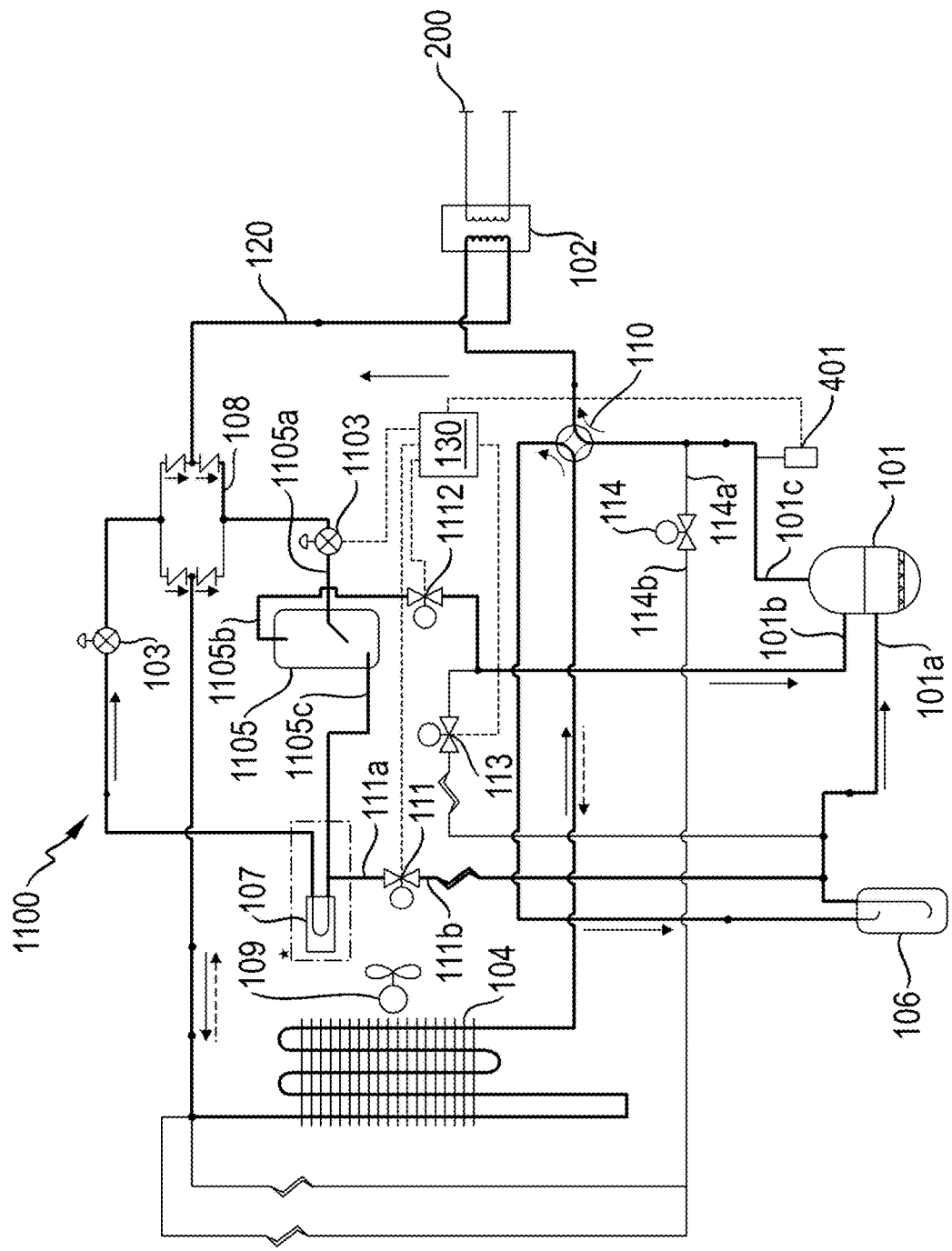
[Fig. 12]

HEAT PUMP

TECHNICAL FIELD

The present disclosure relates to a heat pump, specifically to a heat pump including a compressor for compressing a refrigerant, a utilization side heat exchanger, a main expansion mechanism and a heat source side heat exchanger arranged in a refrigeration path, the heat pump further including a liquid injection valve and a gas injection valve.

BACKGROUND ART

A heat pump is a device which transfers heat energy from a source of heat to a heat sink. Generic heat pumps are well-known and find a number of uses in domestic application such as air-conditioning, refrigerators, domestic heating or domestic hot water. They generally include a compressor, a utilization side heat exchanger, an expansion mechanism and a heat source side heat exchanger arranged in a refrigeration path with a medium circulated through these components to transfer heat between the heat source side heat exchanger to the utilization side heat exchanger, also known as a refrigerant. Heat pumps may be embodied as heating only heat pumps, heating and cooling heat pumps or cooling only heat pumps. In heating only heat pumps, the utilization side heat exchanger functions as a condenser and the heat source side heat exchanger functions as an evaporator. In combined heating and cooling heat pumps, the utilization side heat exchanger functions as a condenser and the heat source side heat exchanger functions as an evaporator in a heating mode and the utilization side heat exchanger functions as an evaporator and the heat source side heat exchanger functions as a condenser in a cooling or defrosting mode. In cooling only heat pumps, the utilization side heat exchanger functions as an evaporator and the heat source side heat exchanger functions as a condenser.

The coefficient of performance of a heat pump is defined as the ratio of the useful heating provided to the work required. Particularly when heating the utilization side (e.g. in heating only heat pumps or in a heating mode of a heating and cooling heat pump), the coefficient of performance is dependent on the temperature difference between the utilization side and the heat source side and the greater the temperature difference, the lower the coefficient of performance of the heat pump. This means that when the ambient temperature of the heat source side (e.g. the outdoor temperature) is low, for example during winter, the compressor of the heat pump needs to operate at a higher capacity in order to bring the utilization side to the required temperature. Similar considerations apply when cooling the utilization side in cooling only heat pumps or in a cooling mode of a heating and cooling heat pump.

In order to increase the capacity of the compressor and improve the coefficient of performance of the heat pump, some heat pumps use a process of 'gas injection' where gaseous refrigerant is injected into the compressor, part-way through the compression process. However, increasing the amount of gas injection also increases the load on the compressor. In situations where a large operation range is required (i.e. a large temperature difference between the utilization side and the heat source side), increasing the amount of gas injection to meet the compressor's capacity demands may result in compressor failure through overloading.

In view of the above, there is a need for an improved heat pump which can operate with a large operation range whilst preventing compressor failure.

SUMMARY OF INVENTION

In one aspect of the present disclosure, there is disclosed a heat pump including a compressor for compressing a refrigerant, a first heat exchanger, a main expansion mechanism and a second heat exchanger arranged in a refrigeration path. The compressor has a suction port, a compression port and an injection port. The heat pump further includes a gas injection valve connected on a first side to the refrigeration path between the first heat exchanger and the main expansion mechanism and on a second side to the injection port of the compressor. The heat pump further includes a liquid injection valve connected on a first side to the refrigeration path between the first heat exchanger and the main expansion mechanism and on a second side between the second heat exchanger and the suction port of the compressor. The heat pump even further includes a controller, the controller being configured to operate the gas injection valve to inject at least partly gaseous refrigerant into the compressor through the injection port. The controller is further configured to operate the liquid injection valve to inject substantially liquid refrigerant into the compressor through the suction port of the compressor. As previously described, the present disclosure may be applied to different kinds of heat pumps. In one embodiment, the basic idea of the present disclosure is applied to heating at a utilization side, that is to a heating only heat pump or to a heating mode of a combined heating and cooling heat pump. In either case, the first heat exchanger is a utilization side heat exchanger functioning, in the heating only heat pump or the heating mode of the combined heating and cooling heat pump, as a condenser and the second heat exchanger is a heat source side heat exchanger functioning as an evaporator. In a cooling mode or a defrosting mode of a combined heating and cooling heat pump the process is reversed and the utilization side heat exchanger functions as an evaporator and the heat source side heat exchanger functions as a condenser. In the following, the disclosure is described primarily with respect to heating a utilization side, that is to a heating only heat pump or to a heating mode of a combined heating and cooling heat pump. Yet, the basic idea of the present disclosure may in another embodiment as well be applied to cooling at a utilization side, that is to a cooling only heat pump or to a cooling mode of the combined heating and cooling heat pump. In such cases, the first heat exchanger is a heat source side heat exchanger functioning, in the cooling only heat pump or in the cooling mode of the combined heating and cooling heat pump, as a condenser and the second heat exchanger is a utilization side heat exchanger functioning as an evaporator. Hence, in one example, when the heat pump of the present disclosure is operated and the control executed, the first heat exchanger functions as or is a condenser and the second heat exchanger functions as or is an evaporator.

In some embodiments this may result in an improved heat pump which can operate with an increased operation range whilst preventing compressor failure.

Throughout this disclosure the term 'utilization side' may refer to the side of the heat pump where the temperature needs to be controlled.

Throughout this disclosure the term 'heat source side' may refer to the side of the heat pump where the temperature is not controlled.

Throughout this disclosure the term 'main expansion mechanism' refers to any element which allows a refrigerant to expand and reduce its pressure by passing through it. The 'main expansion mechanism' may be, for example, a thermal expansion valve. A standard refrigeration cycle requires four components: a compressor, a condenser, an expansion mechanism and an evaporator. The 'main' expansion mechanism in this disclosure refers to this expansion mechanism which is essential to a standard refrigeration cycle.

Throughout this disclosure, the term 'gas injection valve' may refer to any element capable of controlling the flow of at least partially gaseous refrigerant through it. The 'gas injection valve' may be, for example, a thermal expansion valve or a solenoid valve.

Throughout this disclosure, the term 'liquid injection valve' may refer to any element which is capable of controlling the flow of substantially liquid refrigerant through it. The 'liquid injection valve' may be, for example, a solenoid valve or a thermal expansion valve.

Throughout this disclosure, the term 'to open' may refer to the opening process of a valve from a first state to a second state, wherein the valve is more open in the second state than in the first state. In the first state, the valve may be fully closed or partly opened. In the second state, the valve may be partly open or fully open.

Throughout this disclosure, the term 'to close' may refer to the closing process of a valve from a third state to a fourth state, wherein the valve is more closed in the fourth state than in the third state. In the fourth state, the valve may be fully closed or partly opened. In the third state, the valve may be partly open or fully open.

The heat pump may further include an economising heat exchanger which is configured to exchange heat between refrigerant leaving the utilization side heat exchanger and refrigerant leaving the gas injection valve and entering the injection port of the compressor.

In some embodiments, this may result in effective production of gas and liquid refrigerant to be used in gas and liquid injection, respectively.

The heat pump may further include a gas-liquid separator connected between the utilization side heat exchanger and the main expansion mechanism, the gas-liquid separator including an inlet port, a gas outlet port and a liquid outlet port. The heat pump may further include a secondary expansion mechanism connected between the utilization side heat exchanger and the inlet port of the gas-liquid separator. The gas injection valve may be connected on a first side to the gas outlet of the gas-liquid separator. The liquid injection valve may be connected on a first side to the refrigeration path between the liquid outlet of the gas-liquid separator and the main expansion mechanism.

In some embodiments, this may result in effective separation of gas and liquid refrigerant to be used in gas and liquid injection, respectively.

The heat pump may further include a temperature determining device for determining the discharge temperature of the refrigerant leaving the compression port of the compressor. The controller may be configured to open the gas injection valve when the discharge temperature exceeds a first threshold to operate the heat pump in a first mode.

In some embodiments, this may result in added capacity to the compressor by increasing the mass of refrigerant. In some embodiments, this may further result in cooling the compressor, reducing the temperature of the refrigerant at the compression port of the compressor and improving the coefficient of performance of the heat pump.

The heat pump may further include a compressor load determining device. The controller may be configured to limit the opening of the gas injection valve when the load of the compressor exceeds a second threshold.

In some embodiments, this may prevent overloading of the compressor and therefore may prevent the compressor from failing due to overloading.

The controller may be configured to open the liquid injection valve when the discharge temperature of the refrigerant exceeds a third threshold to operate the heat pump in a second mode. The third threshold may be higher than the first threshold.

In some embodiments, this may result in the compressor being able to operate at a larger capacity and the heat pump being able to operate with a larger operation range whilst preventing compressor failure due to overloading.

The heat pump may further include an accumulator connected between the heat source side heat exchanger and the suction port of the compressor. The liquid injection valve may be connected on the second side to the refrigeration path between the accumulator and the suction port of the compressor.

In some embodiments, this may prevent any liquid refrigerant from the evaporator entering the suction port of the compressor. In some embodiments, this may further result in the liquid refrigerant from the liquid injection valve being able to enter the suction port of the compressor to cool the compressor.

Throughout this disclosure the term 'accumulator' may refer to an element which collects liquid refrigerant and allows gaseous refrigerant to pass through.

The heat pump may further include a low pressure bypass valve connected between the suction port and the injection port of the compressor. The controller may be configured to operate the low pressure bypass valve to equalise pressure between the suction port and the injection port of the compressor.

In some embodiments, this may prevent reverse flow of refrigerant through the compressor and leakage of the refrigerant inside the compressor.

Throughout this disclosure the term 'low pressure bypass valve' may refer to an element which is capable of controlling the flow of liquid and gaseous refrigerant through it. The 'low pressure bypass valve' may be, for example, a solenoid valve.

The controller may be configured to open the liquid injection valve and the low pressure bypass valve and close the gas injection valve to operate the heat pump in a third mode.

In some embodiments, this may allow for better control of the discharge temperature of the compressor and the compressor current.

The controller may be configured to open the liquid injection valve, the low pressure bypass valve and the gas injection valve to operate the heat pump in a fourth mode.

In some embodiments, this may result in a large capacity range for the compressor and protect the compressor.

The heat pump may further include a hot gas bypass valve connected on a first side to the refrigeration path between the compression port of the compressor and the utilization side heat exchanger and on a second side between the main expansion mechanism and the heat source side heat exchanger. The controller may be configured to operate the hot gas bypass valve to allow refrigerant to pass from the compression port of the compressor to the refrigeration path between the main expansion mechanism and the heat source side heat exchanger.

In some embodiments, this may allow hot gaseous refrigerant to pass through the heat source side heat exchanger to help defrost the heat source side heat exchanger.

Throughout this disclosure the term 'hot gas bypass valve' may refer to an element which is capable of controlling the flow of liquid and gaseous refrigerant through it. The 'hot gas bypass valve' may be, for example, a solenoid valve.

The controller may be configured to open the liquid injection valve, the gas injection valve, the low pressure bypass valve and the hot gas bypass valve to operate the heat pump in a fifth mode.

In some embodiments, this may result in a very large capacity cycle range. In some embodiments, this may allow the compressor to continue running at normal load even when very low capacity is required.

The heat pump may further include a 4-way reversing valve, connected between the compression port of the compressor, the utilization side heat exchanger, the heat source side heat exchanger and the suction port of the compressor, for reversing the flow of refrigerant through the refrigeration path. The heat pump may further include a flow control element connected between the utilization side heat exchanger and the heat source side heat exchanger such that the refrigerant can flow unidirectionally in a loop through the main expansion mechanism when the flow of the refrigerant through the refrigeration path is reversed In some embodiments, this may result in a reversible heat pump which is able to heat and cool the utilization side.

Throughout this disclosure the term 'flow control element' may refer to an element which only allows refrigerant to flow through the refrigeration path in one direction. The 'flow control element' may be a number of check valves arranged in a bridge arrangement, for example.

The heat pump may further include a PCB cooling element connected between the utilization side heat exchanger and the main expansion mechanism for cooling a PCB including an inverter for supplying current to the compressor.

In some embodiments, this may result in more efficient cooling of the PCB supplying current of the compressor. In some embodiments, this may further result in the compressor being able to operate at a higher current and capacity.

The liquid injection valve may be connected on the first side to the refrigeration path between the economising heat exchanger and the main expansion mechanism.

In some embodiments, this may result in the liquid refrigerant passing through the liquid injection valve and entering the suction port of the compressor being subcooled.

The refrigerant may be a hydrofluorocarbon refrigerant.

The refrigerant may be, for example, R32.

To enable better understanding of the present disclosure, and to show how the same may be carried into effect, reference will now be made, by way of example only, to the accompanying drawings.

BRIEF DESCRIPTION OF DRAWINGS

FIG. 1 shows a schematic diagram of a heat pump according to a first embodiment of the present disclosure.

FIG. 2 shows a schematic diagram of a heat pump according to a first embodiment of the present disclosure operating a standard refrigeration cycle.

FIG. 3 shows a pressure-enthalpy diagram of the heat pump operating a standard refrigeration cycle.

FIG. 4 shows a schematic diagram of a heat pump according to a first embodiment of the present disclosure operating in a first mode.

FIG. 5A shows a pressure-enthalpy diagram of the heat pump operating in a first mode.

FIG. 5B shows a pressure-enthalpy diagram of the heat pump operating in a first mode for the situation when the amount of gas injection is reduced.

FIG. 6 shows a schematic diagram of a heat pump according to a first embodiment of the present disclosure operating in a second mode.

FIG. 7 shows a pressure-enthalpy diagram of the heat pump operating in a second mode.

FIG. 8 shows a schematic diagram of a heat pump according to a first embodiment of the present disclosure operating in a third mode.

FIG. 9 shows a schematic diagram of a heat pump according to a first embodiment of the present disclosure operating in a fourth mode.

FIG. 10 shows a shows a schematic diagram of a heat pump according to a first embodiment of the present disclosure operating in a fifth mode.

FIG. 11 shows a schematic diagram of a heat pump according to a second embodiment of the present disclosure.

FIG. 12 shows a schematic diagram of a heat pump according to a second embodiment of the present disclosure operating in a second mode.

DESCRIPTION OF EMBODIMENTS

FIG. 1 shows a schematic diagram of a heat pump 100 according to a first embodiment of this disclosure. The heat pump 100 is used in an example for a domestic hot water supply but may be suitable for a number of other applications. The heat pump 100 includes a compressor 101, a utilization side heat exchanger 102, a main expansion mechanism 103 and a heat source side heat exchanger 104 connected in a refrigeration path 120. A refrigerant flows through the refrigeration path and moves heat energy between the heat source side and the utilization side. The refrigerant is preferably a hydrofluorocarbon such as R32, for example. In this context, is to be emphasized that the discharge temperature of R32 can be significantly higher as compared to previously used refrigerants, particularly R410A.

The heat pump 100 further includes a liquid injection valve 111, a gas injection valve 112, a low pressure bypass valve 113, a hot gas bypass valve 114, an economising heat exchanger 105, a 4-way reversing valve 110, a flow control element 108, an accumulator 106 and a PCB cooling element 107.

The 4-way reversing valve 110 is connected between compression port 101c of the compressor 101, the utilization side heat exchanger 102, the suction port 101a of the compressor 101 and the heat source side heat exchanger 104. The flow control element 108 including four check valves in a bridge arrangement is connected between the utilization side heat exchanger 102 and the heat source side heat exchanger 104 to allow the refrigerant to flow in a unidirectional loop through the main expansion mechanism 103. The PCB cooling element 107 and the economising heat exchanger 105 are connected within this unidirectional cooling loop. The liquid injection valve 111 is connected on a first side 111a to the refrigeration path between the utilization side heat exchanger 102 and the main expansion mechanism 103, preferably to the refrigeration path between the PCB cooling element 107 and the economising heat exchanger 105. The liquid injection valve 111 is connected on a second side 111b to the refrigeration path between the accumulator 106 and the suction port 101a of the compressor 101. The gas injection valve 112 is connected on a first side 112a to the refrigeration path between the utilization side heat exchanger 102 and the main expansion mechanism 103, preferably to the refrigeration path between the PCB cooling element 107 and the main expansion mechanism 103. The second side 112b of the gas injection valve 112 is connected to the gas injection port 101b of the compressor through the economising heat exchanger 105. The low pressure bypass valve 113 is connected between the suction port 101a and the injection port 101b of the compressor 101. The hot gas bypass valve 114 is connected on a first side 114a to the refrigeration path between the compression port 101c of the compressor 101 and the 4-way reversing valve 110 and on a second side 114b to the refrigeration path between the main expansion mechanism 103 and the heat source side heat exchanger 104.

The compressor 101 may, as in the example, be a semi-hermetic screw type compressor. The compressor 101 has a suction port 101a, an injection port 101b and a compression port 101c. The refrigerant enters the compressor 101 through the suction port 101a where it is compressed by two inter-leaving scrolls to a higher pressure and temperature and then leaves the compressor 101 through the compression port 101c. Refrigerant can also enter the compressor 101 through the injection port 101b which is part-way through the compression process. The injection port 101b is located closer to the compression port 101c than the suction port 101a is located to the compression port 101c.

The utilization side heat exchanger 102 may be a plate heat exchanger but may be any other suitable heat exchanger. The utilization side heat exchanger 102 heats or cools the side of the heat pump 100 where temperature control is desired. In this case, the utilization side heat exchanger 102 heats or cools the domestic hot water supply 200.

The main expansion mechanism 103 is a thermal expansion valve. Liquid refrigerant flowing through the main expansion mechanism 103 expands into a gas and liquid mixture of refrigerant which causes the pressure and temperature of the refrigerant to drop. The main expansion mechanism 103 can be opened and closed to control the flow rate of refrigerant through it.

The heat source side heat exchanger 104 exchanges heat with the side of the heat pump 100 where no temperature control is desired. In this embodiment, the heat may be drawn directly from the ambient air outside. The heat exchanger includes a number of coils and a fan 109 is used to increase the flow of air over the heat exchanger 104 and thus increase the rate of heat transfer. Alternatively, the heat may be drawn directly from the ground or a source of water which will result in smaller temperature variations in the temperature of the heat source side.

The heat pump 100 includes a number of valves to control the flow of refrigerant through the refrigeration path 120.

The valves are connected to and operated by a controller 130. The controller 130 may be generic computer or a microchip which is programmed or configured to open and close the valves of the heat pump 100 in specific configurations and therefore operate the heat pump 100 in a number of different modes to best suit different requirements, as will be described herein.

The 4-way reversing valve 110 can be controlled to reverse the flow of refrigerant through the refrigeration path 120 and therefore switch between heating and cooling the utilization side heat exchanger 102.

When the 4-way reversing valve 110 is switched so that the utilization side heat exchanger 102 is in heating mode, the 4-way reversing valve 110 directs the refrigerant from the compression port 101c of the compressor 101 to the utilization side heat exchanger 102 and then directs the refrigerant coming from the heat source side heat exchanger 104 back to the suction port 101a of the compressor. In this heating mode, the utilization side heat exchanger 102 receives hot gaseous refrigerant and acts as a condenser, whereas the heat source side heat exchanger 104 receives a cold gas-liquid refrigerant mix and acts as an evaporator. The modes of operation described herein mainly relate to heating of the utilization side heat exchanger 102.

In contrast, when the 4-way reversing valve 110 is switched so that the utilization side heat exchanger 102 is in cooling mode, the 4-way reversing valve 110 directs the refrigerant from the compression port 101c of the compressor 101 to the heat source side heat exchanger 104 and the directs the refrigerant coming from the utilization side heat exchanger 102 back to the suction port 101a of the compressor 101. In this cooling mode, the heat source side heat exchanger 104 receives hot gaseous refrigerant from the compression port 101c of the compressor 101 and acts as a condenser, whereas the utilization side heat exchanger 102 receives a cold gas-liquid refrigerant mix and acts as an evaporator. This can be useful for defrosting the heat source side heat exchanger 104 when the ambient temperature (outdoor temperature) on the heat source side is very low.

The accumulator 106 is connected between the 4-way reversing valve 110 and the suction port of the compressor 101. The accumulator 106 is a device which traps any liquid refrigerant which was not boiled off in the evaporator and prevents this liquid refrigerant from entering the suction port 101a of the compressor 101. A heat source may be installed in the accumulator 106 to boil off any liquid refrigerant which has collected in the accumulator 106.

The PCB cooling element 107 is used to cool a printed circuit board (PCB) which houses an inverter for supplying current to the compressor. Especially when the compressor is operating under increased load, more current is flowing through the inverter and therefore more heat is produced by the PCB. The PCB cooling element 107 removes this excess heat by having cold, substantially liquid refrigerant flow through the PCB cooling element 107 which is in contact with or in near proximity to the PCB housing the inverter. The PCB cooling element 107 is not essential to functioning of the heat pump 100, as there are other methods which may be employed to remove heat from the PCB such as a conventional heat sink in combination with a fan, for example.

The liquid injection valve 111 can be any valve which is suitable for controlling the flow of substantially liquid refrigerant through it. In this embodiment, the liquid injection valve 111 is an on-off valve such as a solenoid valve. The liquid injection valve 111 may also be a variable flow control valve such as a thermal expansion valve, for example. The liquid injection valve 111 is operated by the controller 130. When then the liquid injection valve 111 is opened, substantially liquid refrigerant from the utilization side heat exchanger 102 will flow through the liquid injection valve 111 into the suction port 101a of the compressor 101. This process will be referred to as 'liquid injection'.

The gas injection valve 112 is connected on a first side 112a to the refrigeration path between the utilization side heat exchanger 102 and the main expansion mechanism 103.

On a second side 112b, the gas injection valve 112 is connected to the injection port 101b of the compressor 101. The gas injection valve 112 can be any valve which can control the flow of gas and liquid refrigerant therethrough. The gas injection valve 112 can be an on-off valve such as a solenoid valve or a flow control valve like a thermal expansion valve, for example. In this embodiment, the gas injection valve 112 is a thermal expansion valve. The gas injection valve 112 is operated by the controller 130. When the gas injection valve 112 is opened, liquid refrigerant from the utilization side heat exchanger 102 will flow through the gas injection valve 112 and expand to a gas-liquid refrigerant mix with a lower pressure and temperature. The at least partly gaseous refrigerant will then enter the injection port 101b of the compressor 101. This process will be referred to as 'gas injection'.

The economising heat exchanger 105 is positioned with a first input connected to the utilization side heat exchanger 102 and a second input connected to the gas injection valve 112. The economising heat exchanger 105 is therefore configured to exchange heat between the hot liquid refrigerant leaving the utilization side heat exchanger 102 and the colder, at least partly gaseous refrigerant leaving the gas injection valve 112. This has the effect that the liquid refrigerant from the utilization side heat exchanger 102 is subcooled. As a result, the refrigerant at the first side 111a of the liquid injection valve 111 which can enter the suction port 101a of the compressor 101 through 'liquid injection' is colder than the liquid refrigerant leaving the utilization side heat exchanger 102. Furthermore, the refrigerant from the gas injection valve 112 is heated up such that the refrigerant entering the gas injection port 101b of the compressor 101 is substantially in a saturated gaseous state.

The low pressure bypass valve 113 is connected between the suction port 101a and the injection port 101b of the compressor 101. The low pressure bypass valve 113 may be any type of valve which can be operated to control the flow of liquid and gaseous refrigerant though it. In this embodiment, the low pressure bypass valve 113 is a solenoid valve which is operated by the controller 130. When the low pressure bypass valve 113 is opened, the pressure between the suction port 101a and the injection port 101b of the compressor 101 is equalised. This prevents any reverse flow of refrigerant through the compressor 101 and minimises leakage within the compressor 101.

The hot gas bypass valve 114 is connected on a first side 114a to the refrigeration path between the compression port 101c of the compressor 101 and the utilization side heat exchanger 102 and on the second side 114b to the refrigeration path between the main expansion mechanism 103 and the heat source side heat exchanger 104. The hot gas bypass valve 114 is also operated by the controller 130 and when it is opened, hot gaseous refrigerant from the compression port 101c of the compressor 101 can pass straight to the heat source side heat exchanger. This is particularly useful when the ambient temperature on the heat source side is very low, to defrost the base plate of the heat source side heat exchanger 104 as well as the heat source side heat exchanger 104 itself (for details the skilled person is referred to EP 19 161 608.5).

FIG. 2 shows the flow of refrigerant through the heat pump 100 of FIG. 1 operating a standard refrigeration cycle. In this case, the controller 130 is configured to close the liquid injection valve 111, the gas injection valve 112, the low pressure bypass valve 113 and the hot gas bypass valve 114. Hot gaseous refrigerant leaves the compression port 101c of the compressor 101 and enters the utilization side heat exchanger 102. In the utilization side heat exchanger 102, the hot gaseous refrigerant heats up the water on the other side of the heat exchanger and condenses in the process. Colder liquid refrigerant leaves the utilization side heat exchanger 102 and flows through the flow control element 108, the PCB cooling element 107 and is then expanded in the main expansion mechanism 103 to form a mixture of gaseous and liquid refrigerant. This expansion of the refrigerant is accompanied by a drop in pressure and temperature of the refrigerant. The cold mixture of liquid and gaseous refrigerant then enters the heat source side heat exchanger 104 where the remaining liquid is evaporated and then passes through the accumulator 106, where any excess liquid refrigerant is collected, back to the suction port 101a of the compressor 101. The compressor 101 then compresses the gaseous refrigerant to a higher pressure and temperature before the refrigerant exits the compressor 101 through the compression port 101c of the compressor 101.

FIG. 3 shows an idealized pressure enthalpy (p-h) diagram for the operation of the heat pump shown in FIG. 2. The y-axis of the graph represents the pressure of the refrigerant and the x-axis represents the enthalpy of the refrigerant. The dashed lines represent constant temperature lines. As shown in FIG. 3, compression of the refrigerant increases the pressure whilst also increasing the temperature and enthalpy of the refrigerant. The increase in enthalpy during compression is the work that is put into the system by the compressor 101. During condensation of the refrigerant in the utilization side heat exchanger 102, the refrigerant stays at a constant pressure but the refrigerant loses heat and therefore the enthalpy and temperature decrease. Adiabatic expansion of the refrigerant through the main expansion mechanism 103 results in a decrease of temperature and pressure of the refrigerant at constant enthalpy. Finally, the refrigerant is evaporated in the heat source side heat exchanger 104 which increases the enthalpy of the refrigerant.

FIG. 4 shows the heat pump of FIG. 1 operating in a first mode, which will be herein also referred to as a 'gas injection mode'.

The heat pump 100 further includes a temperature determining device 401 which is capable of determining the temperature of the refrigerant leaving the compression port 101c of the compressor 101, also known as the 'compressor discharge temperature'. The temperature determining device 401 may be located inside the compressor 101 at the point where the refrigerant is about to exit the compressor 101 or it may be located just outside the compressor 101 attached to the piping through which the refrigerant flows. The temperature determining device 401 may be any device which can accurately measure the temperature of the refrigerant, such as a thermistor, for example. The temperature determining device 401 is connected to the controller 130 and configured to output the temperature of the refrigerant leaving the compression port 101c of the compressor 101 to the controller 130.

The heat pump 100 also further includes a compressor load determining device connected to the controller 130. The compressor load determining device measures one or more of the following: the motor torque, input power or output power of the compressor to determine the compressor load and outputs this value to the controller 130.

When the outside ambient temperature on the heat source side is low and a high temperature on the utilization side is required, the 'gas injection mode' can be used to increase the capacity of the compressor and improve the coefficient of performance of the heat pump.

In order to provide a high temperature on the utilization side when the ambient temperature on the heat source side is low, the capacity of the compressor 101 increases. This also increases the load of the compressor 101 and therefore the temperature of the refrigerant leaving the compression port 101c of the compressor 101. The controller 130 is configured to monitor the temperature of the refrigerant leaving the compression port 101c of the compressor 101 and if the temperature exceeds a first threshold, the controller 130 opens the gas injection valve 112 to operate the heat pump in a first mode.

The flow of refrigerant through the heat pump 100 in this first mode is shown in FIG. 4. Similarly to FIG. 2, the refrigerant is compressed to a higher pressure and temperature in the compressor 101 and then flows into the utilization side heat exchanger 102 where the refrigerant condenses. The liquid refrigerant then leaves the utilization side heat exchanger 102 and flows through the flow control element 108 and into the economising heat exchanger 105. There the refrigerant exchanges heat with refrigerant which has been bled off downstream of the economising heat exchanger 105 and passed through the gas injection valve 112. The gas injection valve 112 is a variable thermal expansion valve which allows the refrigerant to expand into a gas-liquid mixture at a lower pressure and temperature. The colder liquid-gas mixture refrigerant from the gas injection valve 112 therefore exchanges heat with the hotter liquid refrigerant coming from the utilization side heat exchanger 102. This results in the liquid-gas mixture heating up and turning into substantially saturated gaseous refrigerant, whereas the hotter liquid refrigerant from the utilization side heat exchanger 102 is subcooled.

The remaining liquid refrigerant then passes through the main expansion mechanism 103 where it is expanded into a gas-liquid mixture and passes through the heat source side heat exchanger 104 where the remaining liquid refrigerant is evaporated, accumulator 106 and back to the suction port 101a of the compressor 101.

The substantially saturated gaseous refrigerant exiting the economising heat exchanger 105 enters the injection port 101b of the compressor 101. The injection port 101b of the compressor 101 is located part-way through the compression stage of the compressor. The gaseous refrigerant entering through the injection port 101b therefore enters the compressor 101 at a stage where the refrigerant from the suction port 101a is already partly compressed. The 'gas injection' mode therefore divides the compression process into two stages and reduces the amount of work required by the compressor 101, lowering the amount of gaseous refrigerant entering the evaporator and thus increases the capacity of the compressor 101 and the coefficient of performance of the heat pump 100.

FIG. 5A shows the idealized pressure-enthalpy (p-h) chart for the first mode of operation described above.

The graph is similar to the one shown in FIG. 3 and described above. The graph shows a further line representing the 'gas injection' refrigerant which is injected into the gas injection port 101b of the compressor 101. It can be seen that the gas injection refrigerant is expanded to an intermediate pressure between the condensation and evaporation pressure and injected part-way through the compression process. This has the effect of dividing the compression process into two stages and reducing the amount of work required by the compressor 101 to compress a unit mass of refrigerant to the required pressure. The reduction in the amount of work done by the compressor is shown as ΔW. Furthermore, the economising heat exchanger 105 subcools the liquid refrigerant which enters the main expansion mechanism 103. The refrigerant which expands through the main expansion mechanism 103 and subsequently enters the heat source side heat exchanger 104 and is evaporated there is therefore at a lower enthalpy than in the mode with no gas injection. The refrigerant is therefore able to take up more heat which is indicated by ΔQ. Since the heat pump can supply more heat to the utilization side heat exchanger 102 and the compressor 101 requires less work to compress the refrigerant, the coefficient of performance increases.

As can be seen on the graph, gas injection also reduces the temperature of the refrigerant leaving the compression port 101c of the compressor 101.

However, an increased amount of gas injection will increase the capacity of the compressor 101 and therefore result in an increase in the load of the compressor, even though the work done to compress a unit of mass of refrigerant W is reduced. In order to avoid overloading and subsequent failure of the compressor 101, the amount of gas injection may need to be limited in some cases. The controller 130 is therefore configured to monitor the load of the compressor 101 through the compressor load determining device and limit or reduce the opening of the gas injection valve 112 when the load of the compressor 101 exceeds a second threshold.

FIG. 5B shows an idealized pressure enthalpy (p-h) chart for the situation when the amount of gas injection is reduced. The graph is similar to the one shown in FIG. 5A, however, by reducing the amount of gas injection, the gaseous refrigerant which enters the compressor 101 through the injection port 101b is now at a lower pressure and temperature. This results in an increased amount of work done to compress one unit mass of refrigerant (i.e. ΔW is smaller) by the compressor with respect to FIG. 5A and also results in an increase in the temperature of the refrigerant leaving the compression port 101c of the compressor 101, as shown by ΔT.

However, since less gaseous refrigerant is injected into the compressor 101, the capacity and therefore the load of the compressor 101 is reduced.

FIG. 6 shows the heat pump of FIG. 1 operating in a second mode, which will be herein also referred to as a 'combined liquid and gas injection mode'. In this second mode the controller 130 is configured to open the liquid injection valve 111 and the gas injection valve 112 and close the low pressure bypass valve 113 and the hot gas bypass valve 114.

During the gas injection mode described above, the controller 130 continually measures the compressor discharge temperature of the refrigerant and the load of the compressor 101 and adjusts the opening of the gas injection valve 112 and therefore the amount of gas injection accordingly.

However, when the outdoor ambient temperature is very low and a high temperature is required on the utilization side, an increase in gas injection may be required to deal with the increased capacity requirements and reduce the compressor discharge temperature of the refrigerant. This increase in gas injection will result in the load of the compressor 101 being increased and may cause a compressor failure due to overloading.

In order to deal with this high temperature lift when the outside ambient temperature is very low and provide a greater operation range for the heat pump, the heat pump 100 is operated in this second mode.

The controller 130 continually measures the temperature of the refrigerant leaving the compression port 101c of the compressor 101 and the load of the compressor 101. When the discharge temperature rises above a first threshold, the gas injection valve 112 is opened to allow colder gaseous refrigerant to enter the compressor 101 through the injection port 101b. The opening of the gas injection valve 112 and therefore the amount of gas injected is limited or reduced when the load of the compressor 101 exceeds a second threshold. The controller 130 then further monitors the compressor discharge temperature of the refrigerant and when this temperature exceeds a third threshold, the liquid injection valve 111 is opened to operate the heat pump in a second mode. This allows cold liquid refrigerant to enter into the suction port 101a of the compressor 101 to cool the compressor 101 and also increase the capacity of the compressor 101.

FIG. 6 shows the path of the refrigerant flowing through the heat pump operating in the second mode. The refrigerant leaves the compression port 101c of the compressor 101 as a hot, high pressure gas and enters the utilization side heat exchanger 102 where heat is transferred from the refrigerant to the domestic hot water supply and the refrigerant thus condenses. The liquid refrigerant then flows through the flow control element 108 and the economising heat exchanger 105 where the liquid refrigerant from the utilization side heat exchanger is further cooled by the partly gaseous refrigerant leaving the gas injection valve 112. Some of this liquid refrigerant then flows through the liquid injection valve 111 into the suction port 101a of the compressor 101 to cool the compressor 101 and provide further capacity to the compressor 101. Furthermore, some of the liquid refrigerant enters the gas injection valve 112 and is expanded to a gas-liquid mixture at a lower pressure and temperature before entering the economising heat exchanger 105 where it is heated up to a substantially saturated gaseous state. This substantially saturated gaseous refrigerant then enters the gas injection port 101b of the compressor 101 to increase the capacity of the compressor 101 and improve the coefficient of performance of the heat pump 100. The remaining liquid refrigerant flows through the main expansion mechanism 103 where the refrigerant is expanded, the heat source side heat exchanger 104 where the remaining liquid refrigerant is evaporated and then back to the suction port 101a of the compressor 101.

FIG. 7 shows an idealized pressure-enthalpy (p-h) chart for the operation of the second mode of operation described above with respect to FIG. 6.

The graph is similar to the one shown in FIG. 5A with respect to the first mode, however, the graph in FIG. 7 further shows a liquid injection component. The liquid injection component reduces the enthalpy of the refrigerant entering the compressor 101 at the suction port 101a. This further reduces the amount of work per unit mass required by the compressor 101 to compress the gas to the required pressure. Furthermore, the compressor discharge temperature of the refrigerant is also reduced as indicated by ΔT.

Overall, operation of the heat pump in the second mode therefore results in a higher capacity with a lower compressor load and lower compressor discharge temperature. The heat pump can therefore achieve a higher operation range and provide a high leaving water temperature on the utilization with very low ambient temperatures on the heat source side without causing a compressor failure due to overloading. In some cases, a leaving water temperature of at least 70° C. may be achieved at an ambient temperature lower than −15° C.

FIG. 8 shows the heat pump of FIG. 1 operating in a third mode, which will be herein also referred to as a 'liquid injection mode'. In this third operation mode, the liquid injection valve 111 and the low pressure bypass valve 113 are opened whilst the gas injection valve 112 and the hot gas bypass valve 114 are closed.

The refrigerant leaves the compression port 101c of the compressor 101 as a hot gas and enters the utilization side heat exchanger 102 where the refrigerant condenses. The refrigerant then flows through the flow control element 108 and subsequently some of the liquid refrigerant is bled off and flows through the liquid injection valve 111 to enter the suction port 101a of the compressor 101 directly. The remaining refrigerant flows through the main expansion mechanism 103 where it is expanded into a gas-liquid mixture and enters heat source side heat exchanger 104 where the remaining liquid refrigerant evaporates before the now substantially gaseous refrigerant flows through the accumulator 106 and back to the suction port 101a of the compressor 101. The low pressure bypass valve 113 is also opened to allow pressure equalisation between the suction port 101a and the injection port 101b of the compressor 101. This prevents any reverse flow of the refrigerant through the compressor 101 and thus helps to prevent leakage of refrigerant inside the compressor 101.

The heat pump 100 is operated in this third mode when the ambient temperature on the heat source side is high and the compressor 101 is only required to operate at a low capacity. The liquid injection reduces the temperature of the refrigerant leaving the compressor 101 through the compression port 101c.

FIG. 9 shows the heat pump of FIG. 1 operating in a fourth mode. In this fourth mode, the liquid injection valve 111, the gas injection valve 112 and the low pressure bypass valve 113 are all open, whilst the hot gas bypass valve 114 is closed.

The refrigerant flows through the refrigeration path in the same manner as described for the second mode with reference to FIG. 4 above. However, in the fourth mode, the low pressure bypass valve 113 is also open. The low pressure bypass valve 113 may function as an expansion valve and/or a capillary may be disposed downstream of the low pressure bypass valve 113 to realize expansion and at least partly liquefy the refrigerant flowing via the gas injection valve 112 and the economizing heat exchanger 105 through the low pressure bypass valve 113 and the optional capillary towards the suction port 101a. The gaseous refrigerant from the gas injection valve 112 will therefore also enter through the suction port 101a of the compressor 101 and vice versa. Thereby the discharge temperature at the discharge port 101c can be reduced at the same time increasing the capacity of the compressor 101 due to additional refrigerant being fed to the suction port 101a via the low pressure bypass valve 113.

The heat pump 100 is operated in this fourth mode when a low capacity is needed to give the compressor 101 a larger capacity range. The coefficient of performance of the heat pump 100 is reduced allowing the compressor 101 to operate at a normal load even when only a low capacity is required. This prevents the compressor 101 from having to continually turn on and off in order to satisfy the low capacity requirements, therefore reducing strain on the compressor 101 and extending the compressor lifetime.

FIG. 10 shows the heat pump of FIG. 1 operating in a fifth mode. In this fifth mode, the liquid injection valve 111, the gas injection valve 112, the low pressure bypass valve 113 and the hot gas bypass valve 114 are all open.

In this mode, the hot high pressure gaseous refrigerant exits the compression port 101c of the compressor 101. Some of the gaseous refrigerant passes through the hot gas bypass valve 114 and enters the heat source side heat exchanger 104 directly. The remaining refrigerant flows through the utilization side heat exchanger 102 where it condenses. The liquid refrigerant then continues to flow through the flow control element 108 and the economising heat exchanger 105 where the liquid refrigerant is subcooled. Some of this liquid refrigerant is bled off and flows through the liquid injection valve 111 into the suction port 101a of the compressor 101. Of the remaining refrigerant some flows through the gas injection valve 112 and the economising heat exchanger 105, where it is heated up, to enter the injection port 101b of the compressor 101. The remaining refrigerant flows through the main expansion mechanism 103 and the heat source side heat exchanger 104 where the refrigerant is evaporated and returns to the suction port 101a of the compressor 101. The low pressure bypass valve 113 is also open which allows gaseous refrigerant from the gas injection valve 112 to enter through the suction port 101a of the compressor 101 and refrigerant from the heat source side heat exchanger 104 and the liquid injection valve 111 to enter through the injection port 101b.

This fifth mode is particularly beneficial when high ambient (outdoor) temperatures occur and the suction density increases. As a result, there may be a pressure increase on the high pressure side (at the discharge port 101c) of the compressor 101. If the pressure becomes too high, the compressor speed will need to be decreased. Yet, due to the high density, a higher torque of the compressor 101 is required even though the rotational speed is low. Accordingly, the power consumption of the compressor 101 increases, and efficiency is deteriorated. This may be avoided in the fifth mode. In particular, high-pressure gaseous refrigerant bypasses the utilization side heat exchanger 102 functioning as a condenser and is directly fed to the heat source side heat exchanger 104 via the pipe on the first side 114a, the valve 114 and the pipe on the second 114b when the hot gas bypass valve 114 is opened in heating operation.

By opening all of the valves in the heat refrigeration circuit, the coefficient of performance of the heat pump 100 is drastically reduced as the refrigerant is not compressed and expanded efficiently. The heat pump 100 is operated in this fifth mode when a very low capacity is required. Operating in this mode essentially allows the compressor 101 to continue working at a normal load while capacity is drastically reduced and a high temperature is achieved. This can protect the compressor 101 at very low required capacity by preventing it from continually turning on and off to satisfy the low capacity requirements.

FIG. 11 shows a schematic diagram of a heat pump 1100 according to a second embodiment of the disclosure. The heat pump 1100 shown in FIG. 11 is similar to the one shown in FIG. 1 and like reference numerals refer to like parts. The difference between the two heat pumps is that heat pump 1100 has a gas-liquid separator 1105 instead of an economising heat exchanger 105.

The gas-liquid separator 1105 includes an input port 1105a, a gas output port 1105b and a liquid output port 1105c. The gas-liquid separator 1105 is able to separate the gaseous component of the refrigerant from the liquid component of the refrigerant. The gaseous refrigerant leaves the gas-liquid separator 1105 through the gas outlet port 1105b whereas the liquid refrigerant leaves the gas-liquid separator 1105 through the liquid outlet port 1105c.

The liquid refrigerant then continues to flow through the main expansion mechanism 103 and the heat source side heat exchanger 104 back to the suction port 101a of the compressor 101.

The gaseous refrigerant exits the gas outlet port 1105b and flows through gas injection valve 1112 into the injection port 101b of the compressor 101. The gas injection valve 1112 in this embodiment may be a simple on-off valve such as a solenoid valve.

The heat pump 1100 further includes a secondary expansion mechanism 1103 upstream of the inlet port 1105a of the gas-liquid separator 1105. The liquid refrigerant from the utilization side heat exchanger is expanded into a gas-liquid mixture by this secondary expansion mechanism 1103 before entering the gas-liquid separator 1105. The secondary expansion mechanism 1103 may be a variable expansion valve. The amount of gas injection into the compressor can therefore be controlled by controlling the opening of the secondary expansion mechanism 1103. The gas injection can be turned on and off through opening and closing of the gas injection valve 1112.

The function of the gas-liquid separator 1105 is similar to that of the economising heat exchanger 105 in that the gas-liquid separator 1105 produces saturated gas to be injected into the injection port 101b of the compressor 101 and subcooled liquid to enter the heat source side heat exchanger 104. The subcooled liquid may also be used for liquid injection into the suction port 101a of the compressor 101.

The other components of the heat pump 1100 function in the same manner as described previously with reference to FIGS. 1-10 above.

Heat pump 1100 can also carry out the first to fifth modes of operation in the same manner as described above for heat pump 100.

FIG. 12 shows the heat pump of FIG. 11 operating in a second mode. The operation of the heat pump is essentially the same to the one described with reference to FIG. 6 and FIG. 7 above.

After the liquid refrigerant exits the utilization side heat exchanger 102, it passes through the flow control element 108 and is then partly expanded into a gas-liquid mixture in the secondary expansion mechanism 1103. This mixture of gas and liquid refrigerant then enters the gas-liquid separator 1105. The liquid refrigerant leaves the gas-liquid separator 1105 through the liquid outlet port 1105c whereas the gaseous refrigerant leaves through gas outlet port 1105b. The gaseous refrigerant then passes through the open gas injection valve 1112 to the injection port 101b of the compressor 101. Some of the liquid refrigerant then passes through the liquid injection valve 111 to enter the suction port 101a of the compressor 101. The remaining liquid refrigerant passes through the main expansion mechanism 103 where it is expanded to a gas-liquid mixture. The gas-liquid refrigerant mixture then passes through the heat source side heat exchanger 104 where the liquid part of the refrigerant is evaporated and then flows back to the suction port 101a of the compressor 101.

The pressure-enthalpy (p-h) chart is identical to the one shown in FIG. 7 and the gas-liquid separator 1105 and economising heat exchanger 105 can be used inter-changeably. Furthermore, the heat pump 1100 can operate in the same first to fifth modes described above with reference to heat pump 100.

Various modifications will be apparent to those skilled in the art.

The compressor 101 does not have to be a scroll-type compressor. It may be a rotary screw-type compressor, a centrifugal compressor or any other type of compressor which is suitable for liquid and gas injection.

The compressor 101 may be a semi-hermetic or fully hermetic compressor.

The refrigerant can be a substance other than R32. The refrigerant can be any suitable hydrofluorocarbon, chlorofluorocarbon, hydrochlorofluorocarbons, hydrocarbon or bromofluorocarbon, for example.

The heat pump 100 may be used in any suitable application such as refrigeration, heating, ventilation, air conditioning, domestic hot water or industrial heating.

The heat pump 100 may not include an accumulator 106. Alternatively, the heat pump 100 may include any other element which can separate gas and liquid refrigerants.

The heat pump 100 may not include a PCB cooling element 107 connected to the refrigeration path 120. The PCB may be cooled through any other active or passive cooling methods or it may not be cooled at all. The PCB may be air cooled using a heat sink, for example.

The heat pump 100 may not include a 4-way reversing valve 110 and may constantly operate in 'heating' mode where the utilization side is heated and the utilization side heat exchanger 102 acts as a condenser.

The utilization side heat exchanger 102 may not be a plate heat exchanger but can be any other type of heat exchanger which is suitable for the particular application heat pump. The utilization side heat exchanger 102 may be, for example, a shell and tube heat exchanger, a plate and shell heat exchanger, a plate fin heat exchanger, a helical coil heat exchanger, a spiral heat exchanger or HVAC air coils.

The heat source side heat exchanger 104 may not be a number of coils but may be any type of heat exchanger suitable for the particular application of the heat pump. The heat source side heat exchanger 104 may be, for example, a shell and tube heat exchanger, a plate and shell heat exchanger, a plate fin heat exchanger, a helical coil heat exchanger, a spiral heat exchanger or a plate heat exchanger. The heat source side heat exchanger 104 may not include a fan.

The flow control element 108 may not be four check valves in a bridge arrangement but may be any other type of element which allows refrigerant to flow unidirectionally in a loop through the main expansion mechanism 103. The flow control element may be a 4-way reversing valve, for example.

The main expansion mechanism 103 may not be a thermal expansion valve. The main expansion mechanism can be any element which is capable of reducing the pressure of the refrigerant and allowing it to expand. The main expansion mechanism 103 can be a throttle device such as a capillary tube, for example.

The liquid injection valve 111 may be any valve which is capable of controlling the flow of substantially liquid refrigerant through it. It may be a simple on-off valve such as a solenoid valve, gate valve, ball valve or butterfly valve. Alternatively, the liquid injection valve 111 may also be a variable valve such as a thermal expansion valve, plug valve, globe valve or diaphragm valve, for example.

The gas injection valve 112 may be any valve which is capable of controlling the flow of substantially gaseous refrigerant through it. It may be a simple on-off valve such as a solenoid valve, gate valve, ball valve or butterfly valve. Alternatively, the gas injection valve 112 may also be a variable valve such as a thermal expansion valve, plug valve, globe valve or diaphragm valve, for example.

The low pressure bypass valve 113 may be any valve which is capable of controlling the flow of gaseous and liquid refrigerant through it. It may be a simple on-off valve such as a solenoid valve, gate valve, ball valve or butterfly valve. Alternatively, the low pressure bypass valve 113 may also be a variable valve such as a thermal expansion valve, plug valve, globe valve or diaphragm valve, for example.

The hot gas bypass valve 114 may be any valve which is capable of controlling the flow of substantially gaseous refrigerant through it. It may be a simple on-off valve such as a solenoid valve, gate valve, ball valve or butterfly valve. Alternatively, the hot gas bypass valve 114 may also be a variable valve such as a thermal expansion valve, plug valve, globe valve or diaphragm valve, for example.

The economising heat exchanger 105 may be any type of heat exchanger which is suitable for exchanging heat between a hotter and a cooler refrigerant. The economising heat exchanger may be, for example, a shell and tube heat exchanger, a plate and shell heat exchanger, a plate fin heat exchanger, a helical coil heat exchanger, a spiral heat exchanger or a plate heat exchanger.

The secondary expansion mechanism 1103 may not be a thermal expansion valve. The main expansion mechanism can be any element which is capable of reducing the pressure of the refrigerant and allowing it to expand. The secondary expansion mechanism 1103 can be a throttle device such as a capillary tube, for example.

All of the above are fully within the scope of the present disclosure, and are considered to form the basis for alternative embodiments in which one or more combination of the above described features are applied, without limitation to the specific combination disclosed above.

In light of this, there will be many alternatives which implement the teaching of the present disclosure. It is expected that one skilled in the art will be able to modify and adapt the above disclosure to suit its own circumstances and requirements within the scope of the present disclosure, while retaining some or all technical effects of the same, either disclosed or derivable from the above, in light of his common general knowledge in this art. All such equivalents, modifications or adaptations fall within the scope of the present disclosure.

REFERENCE SIGNS LIST 100 heat pump
101 compressor
101a suction port
101b gas injection port
101b injection port
101c compression port
102 utilization side heat exchanger
103 main expansion mechanism
104 heat source side heat exchanger
105 economising heat exchanger
106 accumulator
107 PCB cooling element
108 flow control element
109 fan
110 4-way reversing valve
111 liquid injection valve
112 gas injection valve
113 low pressure bypass valve
114 hot gas bypass valve
120 refrigeration path
130 controller
200 domestic hot water supply
401 temperature determining device
1100 heat pump
1103 secondary expansion mechanism
1105 gas-liquid separator
1112 gas injection valve

The invention claimed is:

1. A heat pump comprising:
a compressor for compressing a refrigerant, a first heat exchanger, a first expansion valve and a second heat exchanger arranged in a refrigeration path, the compressor having a suction port, a compression port and an injection port;
a gas injection refrigerant path connected on a first side of the gas injection refrigerant path to the refrigeration path between the first heat exchanger and the first expansion valve and on a second side of the gas injection refrigerant path to the injection port of the compressor;
a gas injection valve arranged in the gas injection refrigerant path;
a liquid injection refrigerant path connected on a first side of the liquid injection refrigerant path to the refrigeration path between the first heat exchanger and the first expansion valve and on a second side of the liquid injection refrigerant path to the refrigeration path between the second heat exchanger and the suction port of the compressor;
a liquid injection valve arranged in the liquid injection refrigerant path;
a low pressure bypass refrigerant path connecting directly the gas injection refrigerant path at a downstream of the gas injection valve and the refrigeration path between the second heat exchanger and the suction port of the compressor;
a low pressure bypass valve arranged in the low pressure bypass refrigerant path; and
a controller, the controller being configured to operate the gas injection valve to inject at least partly gaseous refrigerant into the compressor through the injection port of the compressor, and to operate the liquid injection valve to inject substantially liquid refrigerant into the compressor through the suction port of the compressor.

2. The heat pump of claim 1, further comprising an economising heat exchanger which is configured to exchange heat between refrigerant leaving the first heat exchanger and refrigerant leaving the gas injection valve and entering the injection port of the compressor.

3. The heat pump of claim 1, further comprising:
a gas-liquid separator connected between the first heat exchanger and the first expansion valve, the gas-liquid separator comprising an inlet port, a gas outlet port and a liquid outlet port; and
a second expansion valve connected between the first heat exchanger and the inlet port of the gas-liquid separator,
wherein the gas injection valve is connected on a first side to the gas outlet of the gas-liquid separator and the liquid injection valve is connected on a first side of the liquid injection valve to the refrigeration path between the liquid outlet of the gas-liquid separator and the first expansion valve.

4. The heat pump of claim 1, further comprising a thermistor for determining a discharge temperature of the refrigerant leaving the compression port of the compressor,
wherein the controller is configured to open the gas injection valve when the discharge temperature exceeds a first threshold to operate the heat pump in a first mode.

5. The heat pump of claim 4, wherein the controller is configured to open the liquid injection valve when the discharge temperature of the refrigerant exceeds a second threshold to operate the heat pump in a second mode, wherein the second threshold is higher than the first threshold.

6. The heat pump of claim 1, further comprising an accumulator connected between the second heat exchanger and the suction port of the compressor, wherein the liquid injection valve is connected to the refrigeration path between the accumulator and the suction port of the compressor.

7. The heat pump of claim 1, wherein the controller is configured to open the liquid injection valve and the low pressure bypass valve and close the gas injection valve to operate the heat pump in a first mode.

8. The heat pump of claim 1, wherein the controller is configured to open the liquid injection valve, the low pressure bypass valve and the gas injection valve to operate the heat pump in a first mode.

9. The heat pump of claim 1, further comprising a hot gas bypass valve connected on a first side to the refrigeration path between the compression port of the compressor and the first heat exchanger and on a second side between the first expansion valve and the second heat exchanger,
wherein the controller is configured to operate the hot gas bypass valve to allow refrigerant to pass from the compression port of the compressor to the refrigeration path between the first expansion valve and the second heat exchanger.

10. The heat pump of claim 9, wherein the controller is configured to open the liquid injection valve, the gas injection valve, the low pressure bypass valve and the hot gas bypass valve to operate the heat pump in a first mode.

11. The heat pump of claim 1, further comprising:
a 4-way reversing valve, connected between the compression port of the compressor, the first heat exchanger, the second heat exchanger and the suction port of the compressor, for reversing the flow of refrigerant through the refrigeration path; and
a flow controller connected between the first heat exchanger and the second heat exchanger such that the refrigerant can flow unidirectionally in a loop through the first expansion valve when the flow of the refrigerant through the refrigeration path is reversed.

12. The heat pump of claim 1, further comprising a PCB cooler connected between the first heat exchanger and the first expansion valve for cooling a PCB comprising an inverter for supplying current to the compressor.

13. The heat pump of claim 1, wherein the refrigerant is a hydrofluorocarbon refrigerant.

14. The heat pump of claim 2, further comprising a thermistor for determining a discharge temperature of the refrigerant leaving the compression port of the compressor,
wherein the controller is configured to open the gas injection valve when the discharge temperature exceeds a first threshold to operate the heat pump in a first mode.

15. The heat pump of claim 3, further comprising a thermistor for determining a discharge temperature of the refrigerant leaving the compression port of the compressor,
wherein the controller is configured to open the gas injection valve when the discharge temperature exceeds a first threshold to operate the heat pump in a first mode.

16. The heat pump of claim 2, further comprising an accumulator connected between the second heat exchanger and the suction port of the compressor, wherein the liquid injection valve is connected to the refrigeration path between the accumulator and the suction port of the compressor.

17. The heat pump of claim 3, further comprising an accumulator connected between the second heat exchanger and the suction port of the compressor, wherein the liquid injection valve is connected to the refrigeration path between the accumulator and the suction port of the compressor.

18. The heat pump of claim 5, wherein
the first mode is a gas injection mode,
the second mode is a combined liquid and gas mode, and
the controller is configured to open the low pressure bypass valve in the first mode,
the controller is configured to close the low pressure bypass valve in the second mode,
the controller is configured to open the low pressure bypass valve and the liquid injection valve and close the gas injection valve when operating in a third mode, and
the third mode is a liquid injection mode.

* * * * *